US00RE38123E

(19) United States
(12) Reissued Patent
Williams

(10) Patent Number: US RE38,123 E
(45) Date of Reissued Patent: May 27, 2003

(54) TOBACCO PRODUCTS HAVING REDUCED NITROSAMINE CONTENT

(75) Inventor: Jonnie R. Williams, Manakin-Sabot, VA (US)

(73) Assignee: Regent Court Technologies, LLC., Chesterfield, MO (US)

(21) Appl. No.: 09/861,577

(22) Filed: May 22, 2001

Related U.S. Patent Documents

Reissue of:
(64) Patent No.: 6,135,121
Issued: Oct. 24, 2000
Appl. No.: 08/879,905
Filed: Jun. 20, 1997

U.S. Applications:

(63) Continuation-in-part of application No. 08/757,104, filed on Dec. 2, 1996, now Pat. No. 5,803,081, which is a continuation-in-part of application No. 08/739,942, filed on Oct. 30, 1996, now abandoned, which is a continuation-in-part of application No. 08/725,691, filed on Sep. 23, 1996, now abandoned, which is a continuation-in-part of application No. 08/671,718, filed on Jun. 28, 1996, now Pat. No. 5,845,647.

(60) Provisional application No. 60/023,205, filed on Aug. 5, 1996.

(51) Int. Cl.[7] ..... A24B 15/22

(52) U.S. Cl. ..... 131/299; 131/294; 131/295; 131/290; 131/347; 204/158.2; 204/158.21; 204/157.6

(58) Field of Search ..... 131/290, 292, 131/294, 295, 299, 347; 204/157.6, 157.43, 158.2, 158.21; 546/279.4

(56) References Cited

U.S. PATENT DOCUMENTS

| | | | |
|---|---|---|---|
| 514,370 | A | 2/1894 | Knott |
| 1,017,713 | A | 2/1912 | Vaughan |
| 1,194,351 | A | 8/1916 | Benjamin |
| 1,339,373 | A | 5/1920 | Buensod |
| 1,543,245 | A | 6/1925 | Buensod |
| 1,545,811 | A | 7/1925 | Buensod |
| 2,082,289 | A | 6/1937 | Hodgin |
| 2,124,012 | A | 7/1938 | Smith, Jr. |
| 2,134,843 | A | 11/1938 | Rouse |

(List continued on next page.)

FOREIGN PATENT DOCUMENTS

| | | | |
|---|---|---|---|
| CA | 1026186 | | 2/1978 |
| DE | 1767677 | * | 6/1968 |
| DE | 3904169 | A1 | 8/1990 |
| GB | 706052 | | 3/1954 |
| GB | 1484663 | | 2/1975 |
| GB | 2 064 294 | A | 6/1981 |
| GR | 86.2434 | | 10/1986 |
| JP | S50-57598 | | 11/1976 |
| WO | WO 94/07382 | | 4/1994 |

OTHER PUBLICATIONS

Declaration of Harold R. Burton, Ph.D. with Exhibits A–H as follows:*
A) Data from QD, FD, MW Sample Testing/1993 Study.*
B) Data from QD and FD Sample Testing/1994 Study.*
C) Progress Report/Undated.*

(List continued on next page.)

*Primary Examiner*—Michael Colaianni
(74) *Attorney, Agent, or Firm*—Banner & Witcoff, Ltd.

(57) ABSTRACT

Methods of reducing the content of and preventing formation of carcinogenic nitrosamines in harvested leafy plants such as tobacco and marijuana, are disclosed. The methods are directed to subjecting the plant to microwave radiation, at appropriate times in the cure cycle. With tobacco, products suitable for human consumption, such as cigarettes, cigars, etc., can be made in accordance with the present invention, having contents of tobacco-specific nitrosamines on a par with fresh-cut, green tobacco. In preferred embodiments, the resultant tobacco products are dried, golden-yellow leaves having almost negligible amounts of the known carcinogens NNN and NNK, in comparison to conventionally cured tobacco.

23 Claims, 1 Drawing Sheet

(1 of 1 Drawing Sheet(s) Filed in Color)

U.S. PATENT DOCUMENTS

| | | | |
|---|---|---|---|
| 2,343,345 | A | 3/1944 | Touton |
| 2,475,568 | A | 7/1949 | Moore, Jr. |
| 2,534,618 | A | 12/1950 | Moore, Jr. |
| 2,758,603 | A | 8/1956 | Heljo |
| 2,989,057 | A | 6/1961 | Touton |
| 3,024,792 | A | 3/1962 | Touton |
| 3,039,475 | A | 6/1962 | Neukomm et al. |
| 3,105,713 | A | 10/1963 | Hassler |
| 3,134,583 | A | 5/1964 | Wilson |
| 3,202,157 | A | 8/1965 | Touton |
| 3,251,620 | A | 5/1966 | Hassler |
| 3,394,709 | A | 7/1968 | Remer |
| 3,494,723 | A | 2/1970 | Gray |
| 3,494,724 | A | 2/1970 | Gray |
| 3,503,137 | A | 3/1970 | Wilson et al. |
| 3,664,034 | A | 5/1972 | Wilson |
| 3,699,976 | A | 10/1972 | Abe et al. |
| 3,773,055 | A | 11/1973 | Stungis et al. |
| 3,785,384 | A | 1/1974 | Sylvester et al. |
| 3,845,774 | A | 11/1974 | Tso et al. |
| 3,870,053 | A | 3/1975 | Heitkamp et al. |
| 3,877,468 | A | 4/1975 | Lichtneckert et al. |
| 3,899,836 | A | 8/1975 | Johnson |
| 3,901,248 | A | 8/1975 | Lichtneckert et al. |
| 3,927,683 | A | 12/1975 | Wilson |
| 3,937,227 | A | 2/1976 | Azumano |
| 4,114,288 | A | 9/1978 | Fowler |
| 4,156,431 | A | 5/1979 | Epstein et al. |
| 4,192,323 | A | 3/1980 | Horne |
| 4,206,554 | A | 6/1980 | Fowler |
| 4,212,634 | A | 7/1980 | Mitchell et al. |
| 4,247,992 | A | 2/1981 | MacGregor |
| 4,301,817 | A | 11/1981 | Keritsis |
| 4,317,837 | A | 3/1982 | Kehoe et al. |
| 4,355,648 | A | 10/1982 | Bokleman |
| 4,364,401 | A | 12/1982 | Keritsis |
| 4,424,024 | A | 1/1984 | Wilson et al. |
| 4,430,806 | A | 2/1984 | Hopkins |
| 4,470,422 | A | 9/1984 | Joubert et al. |
| 4,482,315 | A | 11/1984 | Day |
| 4,556,073 | A | 12/1985 | Gravely et al. |
| 4,557,280 | A | 12/1985 | Gravely et al. |
| 4,559,956 | A | 12/1985 | De Lange et al. |
| 4,566,469 | A | 1/1986 | Semp et al. |
| 4,572,219 | A | 2/1986 | Gaisch et al. |
| 4,590,954 | A | 5/1986 | Gooden |
| 4,620,556 | A | 11/1986 | Rosson et al. |
| 4,622,982 | A | 11/1986 | Gaisch et al. |
| 4,651,759 | A | 3/1987 | Uydess |
| 4,685,478 | A | 8/1987 | Malik et al. |
| 4,709,710 | A | 12/1987 | Gaisch et al. |
| 4,756,317 | A | 7/1988 | Edwards |
| 4,790,335 | A | 12/1988 | Marley et al. |
| 4,802,498 | A | 2/1989 | Ogren |
| 4,805,642 | A | 2/1989 | Rainer |
| 4,821,747 | A | 4/1989 | Stuhl et al. |
| 4,836,222 | A | 6/1989 | Livingston |
| 4,874,000 | A | 10/1989 | Tamol et al. |
| 4,898,189 | A | 2/1990 | Wochnowski |
| 4,906,274 | A | 3/1990 | Mattox |
| 4,907,605 | A | 3/1990 | Ray et al. |
| 5,018,281 | A | 5/1991 | Bulluck, Jr. |
| 5,023,376 | A | 6/1991 | Shehad et al. |
| 5,125,420 | A | 6/1992 | Livingston |
| 5,127,934 | A | 7/1992 | Mattox |
| 5,139,035 | A | 8/1992 | Lasch et al. |
| 5,335,590 | A | 8/1994 | Crump, III et al. |
| 5,372,149 | A | 12/1994 | Roth et al. |
| 5,431,175 | A | 7/1995 | Beckett et al. |
| 5,488,962 | A | 2/1996 | Perfetti |
| 5,515,775 | A | 5/1996 | Crump, III et al. |
| 5,685,710 | A | 11/1997 | Martinez Sagrera et al. |
| 5,727,573 | A | 3/1998 | Meier et al. |
| 5,791,353 | A | 8/1998 | Junemann et al. |
| 5,803,081 | A | 9/1998 | O'Donnell, Jr. et al. |
| 5,810,020 | A | 9/1998 | Northway et al. |
| 2001/0000386 | A1 | 4/2001 | Peele |

OTHER PUBLICATIONS

D) Coresta Conference, Agronomy & Phytopathology Joint Meeting, Reunion Commune De Groupes Agronomic Et Phytopathologic/Abstracts, Oxford 1995 (see Abstract on p. 5 Burton et al.).*

E) Overheads from 1995 Coresta presentation by Burton, 1993 Study.*

F) Overheads from 1995 Coresta conference presentation by Burton, 1994 Study.*

G) Wiernik et al. Effect of Air–Curing on the Chemical Composition of Tobacco/1995.*

H) Burton Letter to Jonnie R. Williams.*

S. Makleit, Abstract Translation, "Nitrosamines In Tobacco and In Cigarette Smoke," 13 sheets, 1986.

C. W. Suggs, H. B. Peel and T. R. Seaboch, "Bulk Density and Drying Effect on Air Flow Through Flue–Cured Tobacco Leaves," Tob. Sci. 33, pp. 86–90, 1989.

William H. Johnson, "Influence of Harvesting and Process Variables on Bulk Curing Of Bright Leaf Tobacco," Translations of the ASAE, vol. 8, No. 3, pp. 354–357, 1965.

M. D. Boyette and C. W. Suggs, "Flue–Cured Tobacco," 3 sheets, 1992.

George A. Duncan, "Using Fans in Conventional Burley Barns," 3 sheets, Apr. 1992.

Charles H. Risner and Fred N. Wendelboe, "Quantification of Tobacco Specific Nitrosamines In Tobacco," 3 sheets, Jan. 1994.

Defendant R.J. Reynolds Tobacco Company's Responses to Plaintiff's First Set of Interrogatories, filed in the U.S. District Court of Maryland, Civil Action 01–1504, dated Dec. 24, 2001, 27 pages.

Harold R. Burton, Lowell P. Bush, and Mirjana V. Djordjevic, J. Agric. Food Chem., "Influence of Temperature and Humidity on the Accumulation of Tobacco–Specific Nitrosamines in Stored Burley Tobacco,", 1989, 37, 1372–1377.

Abstract, Katami Ueno, Taishukan Publishing Co., Ltd., (translation) "A History of Tobacco," Publication 3, pp. 1–7, 1998.

Abstract, Agriculture Canada, Coresta, Information Bulletin, "Research Relative to Tabacco," pp. 6–22, 1991–2.

D. Layten Davis and Mark T. Nielsen, Blackwell Science, "World Agriculture Series Tobacco Production, Chemistry and Technology," 4 sheets, (date unknown).

J. S. Cundiff, "Fan Cycling and Energy Consumption in Bulk Tobacco Curing," pp 3–29, 1978.

Supplementary European Search Report, EP 99 94 8191, dated Nov. 29, 2001.

Defendant R.J. Reynolds Tobacco Company's Amended and Supplemental Responses to Plaintiff's First Set of Interrogatories, filed in the U.S. District Court of Maryland, Civil Action 01–1504, dated Feb. 22, 2002, 23 pages.

W. S. Schlotzhauer and O. T. Chortyk, Changes in the Chemical Composition of NC 2326 Tobacco Through Ozone Treatment of Intact Leaves, 2 sheets, Oct. 1986.

Dietrich Hoffmann, Abraham Rivenson, Fung–Lung Chung, and Stephen S. Hecht, "Nicotine–Derived N–Nitrosamines (TSNA) and Their Relevance in Tobacco Carcinogenesis," pp. 305–311, vol. 21, Issue 4, 1991.
Joe M. Bunn, George A. Duncan Wiley H. Henson, Jr. and Linus R. Walton, "Environmental Design of a New Burley Curing Barn," (Tobacco Science 1–5), 3 sheets, Jun. 22, 1972.
Walter G. Frankenburg, "Chemical Changes in the Harvested Tobacco Leaf," pp. 326–425, (date unknown).
W.H. Johnson, "Oxygen Depletion By Respiration For Bright Leaf Tobacco In A Closed Curing System," (Tobacco Science 5–11), 4 sheets, (date unknown).
C,W, Suggs, "Mechanical Harvesting Of Flue–Cured Tobacco: Part 10: Optimization of Curing Capacity and Bulk Barn Parameters," (Tobacco Science 126–130), 3 sheets, May 2, 1979.
C,W, Suggs, "Mechanical Harvesting Of Flue–Cured Tobacco: Part 9: Developments in Container (Box) Bulk Curing," (Tobacco Science 1–6), 3 sheets, Jul. 18, 1978.
Bryan W. Maw, Paul E. Sumner and Michael G. Stephenson, "Tobacco Qulaity As Affected by Fan Cycling During Different Stages of Tobacco Curing," Tobacco Science 116–118), 3 sheets, vol. 30, 1986.
ABSTRACT FORM, 41$^{st}$ Tobacco Chemists' Research Conference, Greensboro, NC, 1 sheet, 1987.
FD. CHEM. TOXIC., "Short Paper Tobacco–Specific N–Nitrosamines In Dry Snuff," vol. 25, No. 3, pp. 245–246, 1987.
R. T. Garvin, "How Prolonged Yellowing Affects the Dry–Mass Yield And Chemical Constituents of Flue–Cured Tobacco," (Tobacco Science 13–15), 2 sheets, May 2, 1986.
A. R. Tricker, R. Haubner, B. Spiegelhalder and R. Preussmann, "The Occurrence of Tobacco–Specific Nitrosamines In Oral Tobacco Products and Their Potential Formation Under Simulated Gastric Conditions", Fd. Chem. Toxic. vol. 26. No. 10, pp. 861–865, 1988.
VENTOBACCO, Bulk Curing Barns, Operator's Manual, 18 sheets, Poland 1993.
VENTOBACCO, Curing Computer VK 961, Operator's Manual 20 pp. 1997.
VENTOBACCO, Ventolab 6, Operator's Manual, 3 sheets, Cyprus 1992.
VENTOBACCO, 84 Rack Curing Barn, 8 sheets, Jordan 1992.
VENTOBACCO, Curing Computer VK 981, Operator's Manual, 29 pp. 1998.
Group Research and Development Centre, "The Effect of Curing Techniques on the Nitrosamine Content of Tobacco: A Preliminary Study," 13 sheets, Oct. 13, 1983.
W.J. Chamberlain, O.T. Choritk, J. L. Baker and T. G. Sutton, "Curing Effects on Contents of Tobacco Specific Nitrosamines In Bright and Burley Tobaccos," 11 sheets, 1986.
Research and Development Centre, "The Effect of Agricultural and Curing Practices on Nitrosamine Levels in Tobacco," 42 sheets, Nov. 6, 1986.
Research and Development Centre, "Nitrosamine Reduction By Tobacco Irradiation," 22 sheets, Mar. 1, 1989.
Email communication from Dr. Bertold Spiegelhalder to Paul L. Perito dated May 31, 2001.
S.S. Hecht, "Biochemistry, Biology, and Carcinogenicity of Tobacco–Specific N–Nitrosamines", Chemical Research in n Toxicology, Jun. 1998, vol. 11, No. 6:559–603.
S.V. Bhide et al., "Tobacco–specific N–Nitrosamines [TSNA] in Green Mature and Processed Tobacco Leaves from India", Beitrage zur Tabakforschung International, vol. 14, No. 1, Dec. 1987.
B.K. Larsson et al., "Polycyclic Aromatic Hydrocarbons and Volatile N–Nitrosamines in Some Dried Agricultural Products", Swedish J. agric. Res. 49–56, 1990.
T.C.Tso et al, "Some Agronomic Factors Affecting N–Dimethyl–nitrosamine Content in Cigarette Smoke", Beitrage zur Tabakforschung, Band 8, Heft 1, Jan. 1975.
J.L. Hamilton et al., "Nitrate Concentration Changes During Senescence and Air Curing of Burley Tobacco", Tobacco Science, XXXVI:pp. 133–137; Tobacco International, vol. 184, No. 24, pp. 48–48.
Technology Architecture, 1995, pp. 146, 148, 139.
R.A. Andersen et al., "Effects of Air–Curing Environment on Alkaloid–Derived Nitrosamines in Burley Tobacco", U.S. Department of Agriculture and College of Agriculture, University of Kentucky, Lexington, KY, pp. 451–455.
R.A. Scanlan et al., "N–Nitrosodimethylamine in Nonfat Dry Milk", Chapter 3, 1994 Am. Chem. Soc.
ACS Symposium Series, "Nitrosamines and Related N–Nitroso Compounds", 204$^{th}$ National Meeting of the American Chemical Society, Washington, D.C., Aug. 23–28, 1992, pp. 35–47.
Abstract, M. Cui et al., "Factors in Tobacco–Specific n–Nitrosamine Accumulation in Tobacco", University of Kentucky, 1996.
Abstract, P.D. Legg et al., "Nitrogenous Constituents in Dark Air–Cured and Fire–Cured Cultivars", University of Kentucky; USDA/Georgia, 1986.
S.V. Bhide et al., "Tobacco Specific N–Nitrosamines in Green Mature Tobacco Leaves and its Progressive Increase on Drying and Processing".
G. Stehlik et al., "Concentration of Dimethylnitrosamine in the Air of Smoke–Filled Rooms", Ecotoxicology and Environmental Safeety 6. 495–500 (1982).
M.V. Djordjevic et al., "Tobacco–Specific Nitrosamine Accumulation and Distribution in Flue–Cured Tobacco Alkaloid Isolines", J. Agric.Food Chem 1989, 37, 752, 754, 756.
R.A. Andersen et al., *Changes in Chemical Composition of Homogenized Leaf–Cured and Air–Cured Burley Tobacco Stored in Controlled Environments*, 1982 American Chemical Society, J. Agric. Food Chem. 1982, 30, 663–668.
C.T. MacKown et al., *Tobacco–Specific N–Nitrosamines: Formation During Processing of Midrib and Lamina Fines*, 1988 American Chemical Society, J. Agric. Food Chem. 1988, 36, 1031–1035.
R.A. Andersen et al., *Accumulation of 4–(N–Methyl–N–Nitrosamino)–1–(3–pyridyl)–1–butanone in Alkaloid Genotypes of Burley Tobacco during Postharvest Processing: Comparisons with N'–Nitrosonornicotnie and Probable Nitrosamine Precursors*, Cancer Research vol. 45, Nov. 1985, pp. 5287–5293.
W.J. Chamberlain et al., *Effects of Curing and Fertilization on Nitrosamine Formation in Bright and Burley Tobacco*, Phytochemical Research Unit, USDA, Agricultural Research Service, Beitrage zur Tabakforschung International, vol. 15, No. 2, Apr. 1992.
C. Mingwu et al., *Effect of Maleic Hydrazide Application on Accumulation of Tobacco–Specific Nitrosamines in Air–Cured Burley Tobacco*, J. Agric. Food (1994), 42(12), 2912–16.

W.J. Chamberlain et al., *Studies on the Reduction of Nitrosamines in Tobacco*, Tobacco International, (1986) vol. 188, No. 16, pp. 38–39.

Q. Qungang, *Changes In Tobacco–Specific Nitrosamines, Alkaloids, Nitrate, Nitrite and Lamina Leachate Conductivity of Dark Tobacco During Curing*, Bulletin d'Information—Coresta, (1991) No. 2, pp. 7–22.

C. Mingwu, *The Source and the Regulation of Nitrogen Oxide Production for Tobacco–Specific Nitrosamine Formation During Air–Curing*, University of Kentucky, Lexington, (1998) 178pp. Avail., :UMI, Order No. DA9907718 From: Diss. Abstr. Int., B 1999 59(9), 4548 Dissertation.

W.J. Chamberlain et al., *Levels of N–nitrosonornicotine in Tobaccos Grown Under Varying Agronomic Conditions*, Tobacco International, (1984) vol. 186, No. 26, pp. 111–113.

Abstract, "Treatment of Organic Materials", Research Disclosure, No. 29139, Jul. 1988, XP000054259, New York, NY.

Search Report from EP 97 93 8069 dated Oct. 14, 1999.

Search Report from PCT/US99/20909 dated Dec. 23, 1999.

"The *Nicotiana* Catalogue," Compilation of International Tobacco Germplasm Holdings, Cooperation Centre for Scientific Research Relative to Tobacco (CORESTA), 1998.

Search Report from PCT/US98/12128 dated Jun. 9, 1998.

C.T. MacKown et al., *Tobacco–Specific N–Nitrosamines: Effect of Burley Alkaloid Isolines and Nitrogen Fertility Management*, 1984 American Chemical Society, J. Agric. Food Chem. 1984, 32, 1269–1272.

H.R. Burton et al., "Changes in Chemical Composition of Burley Tobacco during Senescence and Curing. 3. Tobacco–Specific Nitrosamines", J. Agric. Food Chem., 1989, 37, pp. 426–430.

H. Ohshima et al., Identification and Occurrence of Two New N–Nitrosamino Acids in Tobacco Products: 3–(N–Nitroso–N–Methylamino) Propionic Acid and 4–(N–Nitroso–N–Methylamino) Butyric Acid, Cancer Letters, 1985, 153–162.

K. Brunnemann et al., "Analytical Studies on Tobacco–Specific N–Nitrosamines in Tobacco and Tobacco Smoke", Toxicology, Naylor Dana Institute for Disease Prevention, 1991, vol. 21, Issue 4, 235–240.

K. Brunnemann et al., "Role of Tobacco Stems in the Formation of N–Nitrosamines in Tobacco and Cigarette Mainstream and Sidestream Smoke", 1983 American Chemical society, J. Agric. Food Chem., vol. 31, No. 6, 1221–1224.

D. Hoffmann et al., "Carcinogenic Tobacco–specific N–Nitrosamines in Snuff and in the Saliva of Snuff Dippers", Cancer Research 1981, 43, 4305–4308.

S. Hecht et al., "Tobacco–Specific Nitrosamines: Formation From Nicotine in Vitro and During Tobacco Curing and Carcinogenicity in Strain A Mice", J. Natl. Cancer Inst., 1978, vol. 60, No. 4, 819–824.

H. Burton et al., "Distribution of Tobacco Constituents in Tobacco Leaf Tissue. 1. Tobacco–Specific Nitrosamines, Nitrate, and Nitrite, and Alkaloids", J. Agric. Food Chem., 1992, 40, pp. 1050–1055.

H. Burton et al., "Changes in Chemical Composition of Tobacco Lamina during Senescense and Curing. 1. Plastic Pigments", J. Agric. Food Chem., 1985, 33, pp. 879–883.

Program, 44$^{th}$ Tobacco Chemists' Research Conference, 1990, Winston–Salem, North Carolina.

Program, 49$^{th}$ Tobacco Chemists' Research Conference, 1995, vol. 49, Lexington, Kentucky.

B. Spiegelhalder, "A Method for the Determination of Tobacco–specific Nitrosamines (TSNA), Nitrate and Nitrite in Tobacco Leaves and Processed Tobacco", Beitrage zur Tabakforschung International, vol. 14, No. 3, Jan. 1989.

Program Booklet and Abstracts, 53$^{rd}$ Tobacco Science Research Conference, 1999, Montreal, Quebec, Canada.

S. Fischer et al., "Exposure to Tobacco specific nitrosamines by the different habits of tobacco use, examination of transfer rates and the influence of smoking habits".

D. Hoffmann et al., "Nicotine–derived N–Nitrosamines and Tobacco–related Cancer: Current Status and Future Directions", Cancer Research, 1985, vol. 45, 935–944.

S. Hecht et al. "Chemical Studies on Tobacco Smoke. XXXIII. N–Nitrosonornicotine in Tobacco: Analysis of Possible Contributing Factors and Biologic Implications", J. Natl. Cancer Inst., 1974, vol. 54, No. 5, 1237–1244.

D. Ralt et al., "The Role of Bacteria in Nitrosamine Formation", 1981 American Chemical Society, pp. 157–164.

S. Fischer et al., "Investigations on the origin of tobacco–specific nitrosamines in mainstream smoke of cigarettes", Carcinogenesis vol. 11, no. 5 pp. 723–730, 1990.

S. Fischer et al., "Tobacco–specific nitrosamines in Canadian cigarettes", J. Cancer Res. Clin. Oncol., 1990, 116, pp. 563–568.

A.R. Tricker et al., "The occurrence of N–nitroso compounds in kiwam tobacco", Cancer Letters, 49 (1989) 221–224.

S.E. Atawodi et al., "Tobacco–specific nitrosamines in some Nigerian cigarettes", Cancer Letters 97 (1995) 1–6.

Abstract, "Formation of Tobacco–Specific Nitrosamines", German Cancer Research Center, Inst. of Toxicology and Chemotherapy, IM Neuenheimer Feld 280, Heidelberg, FRG.

S. Fischer et al., "No Pyrosynthesis of N'–Nitrosonornicotine (NNN) and 4–(Methylnitrosamino)–1–(3–Pyridyl)–1–Butanone (NNK) from Nicotine", Inst. of Toxicology and Chemotherapy, German Cancer Research Center, Heidelberg, FRG.

P. Mende et al., "Occurrence of the Nitrosamide precursor pyrrolidin–(2)–one in food and tobacco", Carcinogenesis vol. 15, No. 4, pp. 733–737, 1994.

Recent Advances in Tobacco Science, vol. 17, "Topics of Current Scientific Interest in Tobacco Research", Proceedings of a Symposium Presented at the 45$^{th}$ Meeting of the Tobacco Chemists' Research Conference, Oct. 1991, Asheville, North Carolina.

B. Spiegelhalder et al., "Tobacco–specific nitrosamines", European Journal of Cancer Prevention 1996, 5 (Supplement I), 33–38.

K. Brunnemann et al., "N–Nitrosamines in Chewing Tobacco: An International Comparison", J. Agric. Food Chem. 1955, 33, 1178–1181.

S. Fischer et al., "Preformed tobacco–specific nitrosamines in tobacco—role of nitrate and influence of tobacco type", Genesis vol. 10 No. 8, pp. 1511–1517, 1989.

W. Gondwe et al., "Screening Tobacco Types, Cultivars and Curing Methods for Low Nitrosamine Tobacco Production in Malawi", Agricultural Research and Extension Trust, 1996 Coresta Congress at Yokohama, Japan, Nov. 1996.

S. Fischer et al., "Tobacco–specific nitrosamines in European and USA cigarettes", Arch. Geschwulstforsch, 60 (1990) Heft. 3.

D. Hoffmann et al., "The Role of Volatile and Nonvolatile N–Nitrosamines in Tobacco Carcinogenesis", Naylor Dana Inst. for Disease Prevention, American Health Foundation, Valhalla, New York.

M. Dixon et al., "Enzymes", Second Edition, American Press, New York, 1964.

Recent Advances in Tobacco Science, vol. 21, "Impact of Plant Manipulation and Post Harvest Phenomena on Leaf Composition", Symposium Proceedings 49$^{th}$ Meeting Tobacco Chemists' Research Conference, Sep. 24–27, 1995, Lexington, Kentucky.

H. Burton et al., "Relationship between Tobacco–Specific Nitrosamines and Nitrite from Different Air–Cured Tobacco Varieties", J. Agric. Food Chem., 1994, 42, pp. 2007–2011.

Letter from Paul L. Perito to Dr. Bertold Spiegelhalder dated Apr. 2, 2001.

* cited by examiner

TOBACCO PRODUCTS HAVING REDUCED NITROSAMINE CONTENT

Matter enclosed in heavy brackets [ ] appears in the original patent but forms no part of this reissue specification; matter printed in italics indicates the additions made by reissue.

CROSS-REFERENCE TO RELATED APPLICATION

This is application is a continuation-in-part of application Ser. No. 08/757,104 filed Dec. 2, 1996 now U.S. Pat. No. 5,803,081, which is a continuation-in-part of application Ser. No. 08/739,942 filed Oct. 30, 1996 now abandoned, which is a continuation in part of application Ser. No. 08/725,691, filed Sep. 23, 1996 now abandoned, which is a continuation-in-part of application Ser. No. 08/671,718, filed Jun. 28, 1996 now U.S. Pat. No. 5,845,647. The present application and the applications recited above, with the exception of application Ser. No. 08/671,718, filed Jun. 28, 1996, claim priority to provisional application Ser. No. 60/023,205, filed Aug. 5, 1996.

FIELD OF THE INVENTION

The present invention relates to a method of treating tobacco to reduce the content of, or prevent formation of, harmful nitrosamines which are normally found in tobacco. The present invention also relates to tobacco products having low nitrosamine content.

BACKGROUND OF THE INVENTION

Others have described the use of microwave energy to dry agricultural products. Use of microwave energy to cure tobacco is disclosed in U.S. Pat. No. 4,430,806 to Hopkins. In U.S. Pat. No. 4,898,189, Wochnowski teaches the use of microwaves to treat green tobacco in order to control moisture content in preparation for storage or shipping. In U.S. Pat. No. 3,699,976, microwave energy is described to kill insect infestation of tobacco. Moreover, techniques using impregnation of tobacco with inert organic liquids (U.S. Pat. No. 4,821,747) for the purposes of extracting expanded organic materials by a sluicing means have been disclosed wherein the mixture was exposed to microwave energy. In another embodiment, microwave energy is disclosed as the drying mechanism of extruded tobacco-containing material (U.S. Pat. No. 4,874,000). In U.S. Pat. No. 3,773,055, Stungis discloses the use of microwave to dry and expand cigarettes made with wet tobacco.

Prior attempts to reduce tar and harmful carcinogenic nitrosamines primarily have included the use of filters in smoking tobacco. In addition, attempts have been made to use additives to block the effects of harmful carcinogens in tobacco. These efforts have failed to reduce the oncologic morbidity associated with tobacco use. It is known that fresh-cut, green tobacco has virtually no nitrosamine carcinogens. See, e.g., Wiernik et al, "Effect of Air-Curing on the Chemical Composition of Tobacco," Recent Advances in Tobacco Science, Vol. 21, pp. 39 et seq., Symposium Proceedings 49th Meeting Tobacco Chemists' Research Conference, Sep. 24–27, 1995, Lexington, Ky. (hereinafter "Wiernik et al"). However, cured tobacco is known to contain a number of nitrosamines, including the harmful carcinogens N'-nitrosonornicotine (NNN) and 4-(N-nitrosomethylamino)-1-(3-pyridyl)-1-butanone (NNK). It is widely accepted that such nitrosamines are formed post-harvest, during the curing process, as described further herein. Unfortunately, fresh-cut green tobacco is unsuitable for smoking or other consumption.

In 1993 and 1994, Burton et al at the University of Kentucky carried out certain experiments regarding tobacco-specific nitrosamines (TSNA), as reported in the Abstract, "Reduction of Nitrite-Nitrogen and Tobacco N'-Specific Nitrosamines In Air-Cured Tobacco By Elevating Drying Temperatures", Agronomy & Phytopathology Joint Meeting, CORESTA, Oxford 1995. Burton et al reported that drying harvested tobacco leaves for 24 hours at 71° C., at various stages of air curing, including end of yellowing (EOY), EOY+3, EOY+5, etc. resulted in some reduction of nitrosamine levels. Reference is also made to freeze drying and microwaving of certain samples, without detail or results. Applicant has confirmed that in the actual work underlying this Abstract, carried out by Burton et al at the University of Kentucky, the microwave work was considered unsuccessful. Certain aspects of Burton et al's 1993–94 study are reported in Wiernik et al, supra, at pages 54–57, under the heading "Modified Air-Curing". The Wiernik et al article postulates that subjecting tobacco leaf samples, taken at various stages of air-curing, to quick-drying at 70° C. for 24 hours, would remove excess water and reduce the growth of microorganisms; hence, nitrite and tobacco-specific nitrosamine (TSNA) accumulation would be avoided. In Table II at page 56, Wiernik et al includes some of Burton et al's summary data on lamina and midrib nitrite and TSNA contents in the KY160 and KY171 samples. Data from the freeze-drying and the quick-drying tests are included, but there is no mention of the microwaved samples. The article contains the following conclusion:

> It can be concluded from this study that it may be possible to reduce nitrite levels and accumulation of TSNA in lamina and midrib by applying heat (70° C.) to dark tobacco after loss of cell integrity in the leaf. Drying the tobacco leaf quickly at this stage of curing reduces the microbial activity that occurs during slow curing at ambient temperature. It must be added, however, that such a treatment lowers the quality of the tobacco leaf.

Id. at page 56. The Weirnik et al article also discusses traditional curing of Skroniowski tobacco in Poland as an example of a 2-step curing procedure. The article states that the tobacco is first air-cured and, when the lamina is yellow or brownish, the tobacco is heated to 65° C. for two days in order to cure the stem. An analysis of tobacco produced in this manner showed that both the nitrite and the TSNA values were low, i.e., less than 10 micrograms per gram and 0.6–2.1 micrograms per grams, respectively. Weirnik et al theorized that these results were explainable due to the rapid heating which does not allow further bacterial growth. Weirnik et al also noted, however, that low nitrite and TSNA values, less than 15 micrograms per gram of nitrite and 0.2 microgram per gram of TSNA, were obtained for tobacco subjected to air-curing in Poland.

SUMMARY OF THE INVENTION

One object of the present invention is to substantially eliminate or reduce the content of nitrosamines in tobacco intended for smoking or consumption by other means.

Another object of the present invention is to reduce the carcinogenic potential of tobacco products, including cigarettes, cigars, chewing tobacco, snuff and tobacco-containing gum and lozenges.

Still another object of the present invention is to substantially eliminate or significantly reduce the amount of tobacco-specific nitrosamines, including N'-nitrosonornicotine (NNN), 4-(N-nitrosomethylamino)-1-(3-pyridyl)-1-butanone (NNK), N'-nitrosoanatabine (NAT) and N'-nitrosoanabasine (NAB), in such tobacco products.

Another object of the present invention is to treat uncured tobacco at an appropriate time post-harvest so as to arrest the curing process without adversely affecting the tobacco's suitability for human consumption.

Another object of the present invention is to reduce the content of tobacco-specific nitrosamines in fully cured tobacco.

The above and other objects and advantages in accordance with the present invention can be obtained by a process for reducing the amount of or preventing formation of nitrosamines in a harvested tobacco plant, comprising subjecting at least a portion of the plant to microwave radiation, while said portion is uncured and in a state susceptible to having the amount of nitrosamines reduced or formation of nitrosamines arrested, for a sufficient time to reduce the amount of or substantially prevent formation of at least one nitrosamine.

It is preferred that in the process of the invention, the step of subjecting to microwave radiation is carried out on a tobacco leaf or portion thereof after onset of yellowing in the leaf and prior to substantial accumulation of tobacco-specific nitrosamines in the leaf.

It is also preferred that in the process of the invention, the step of subjecting to microwave radiation is carried out prior to substantial loss of the leaf's cellular integrity.

In additional preferred embodiments of the process, the tobacco is flue tobacco and the step of subjecting to microwave radiation is carried out within about 24 to about 72 hours post-harvest, even more preferably within about 24 to about 36 hours post-harvest.

In still other embodiments of the process, the harvested tobacco is maintained under above-ambient temperature conditions in a controlled environment prior to the step of subjecting to microwave radiation.

Preferred aspects of the process include a step, prior to subjecting a tobacco leaf which preferably includes the stem to microwave radiation, of physically pressing the leaf to squeeze excess moisture therefrom, to ensure more uniform drying by the microwave unit. This step can be conveniently carried out by passing the leaf through a pair of appropriately spaced rotating cylindrical rollers prior to entering the microwave cavity.

In yet additional preferred embodiments of the invention, the microwave radiation has a frequency of about 900 to about 2500 MHz, and is applied to the plant for a period of at least about 1 second, and preferably from about 10 seconds to about 5 minutes at a predetermined power level. The power level used generally determines the length of time to which the tobacco is subjected to the microwave radiation, and can range from about 600 to about 1000 watts when using conventional kitchen-type microwave ovens, up to several hundred or more kilowatts for commercial, multimode applicators. Preferred power levels using applicators designed to handle single leaves range from about 2 to about 75 kilowatts, more preferably from about 5 to about 50 kilowatts, which permit relatively rapid treatment to be carried out.

It is also preferred in accordance with the present invention that the microwave radiation is applied to the leaf or portion thereof for a time sufficient to effectively dry the leaf, without charring, so that it is suitable for human consumption.

The present invention also seeks to subject tobacco leaves to microwave radiation to prevent normal accumulation of at least one tobacco-specific nitrosamine, such as N'-nitrosonornicotine, 4-(N-nitrosomethylamino)-1-(3-pyridyl)-1-butanone, N'-nitrosoanatabine and N'-nitrosoanabasine.

The present invention in its broadest forms also encompasses a tobacco product comprising non-green tobacco suitable for human consumption and having a lower content of at least one tobacco-specific nitrosamine than conventionally cured tobacco.

In preferred embodiments, the non-green tobacco product has a TSNA (NNN, NNK, NAB and NAT) content of less than 0.2 $\mu$g/g, more preferably less than about 0.15 $\mu$/g, and even more preferably less than about 0.1 $\mu$g/g, an NNN content of less than about 0.15 $\mu$g/g, more preferably less than about 0.10 $\mu$g/g, and even more preferably less than about 0.05 $\mu$g/g, and an NNK content of less than about 0.002 $\mu$g/g, more preferably less than about 0.001 $\mu$g/g, and even more preferably less than about 0.0005 $\mu$g/g.

The present invention is also directed to a tobacco product comprising dried yellow tobacco suitable for human consumption and having a lower content of at least one tobacco-specific nitrosamine than conventionally cured tobacco. In preferred embodiments, the yellow tobacco product has a TSNA (NNN, NNK, NAB and NAT) content, an NNN content, and an NNK content within the above preferred ranges.

In other embodiments, the non-green or yellow tobacco product comprises non-green or yellow tobacco suitable for human consumption, and having a TSNA (NNN, NNK, NAB and NAT) content within about 25% by weight of the content of such TSNA in the freshly harvested green tobacco crop from which the product was made. It is more preferred that the non-green or yellow tobacco product have a TSNA content within about 10% by weight, more preferably within about 5% by weight and most preferably essentially approximating (e.g. within an amount up to several percent by weight) the content of such TSNA in the freshly harvested tobacco crop from which the product was made. It is also preferred that the non-green or yellow tobacco product comprises non-green or yellow tobacco suitable for human consumption, and having content of at least one TSNA selected from NNN, NNK, NAB and NAT, which is within about 25% by weight, preferably within about 10% by weight, more preferably within about 5% by weight and most preferably essentially approximating (e.g. within an amount up to several percent by weight) of the content of the corresponding TSNA or TSNAs in the freshly harvested green tobacco crop from which the product was made.

In yet additional embodiments of the invention, the non-green or yellow tobacco product comprises non-green or yellow tobacco suitable for human consumption, and having a TSNA (NNN, NNK, NAB and NAT) content which is at least about 75% by weight, preferably at least about 90% by weight, more preferably at least about 95% by weight, and most preferably at least about 99% by weight lower than the content of such TSNA in a tobacco product of the same type made from the same tobacco crop as the product of the invention, but which was cured in the absence of microwave radiation or other techniques designed to reduce TSNA content. It is also preferred that the non-green or yellow tobacco product comprises non-green or yellow tobacco suitable for human consumption, and having a content of at least one TSNA selected from NNN, NNK, NAB and NAT which is at least about 75% by weight, preferably at least about 90% by weight, more preferably at least about 95% by weight, and most preferably at least about 99% by weight lower than the content of the corresponding TSNA or TSNAs in a tobacco product of the same type made from the same tobacco crop as the product of the invention, but which was cured in the absence of microwave radiation or other techniques designed to reduce TSNA content.

A preferred form of the present invention relates to a tobacco product comprising tobacco having a reduced content of at least one tobacco-specific nitrosamine, produced by a process comprising subjecting the tobacco, while the tobacco is uncured and susceptible to having formation of at least one tobacco-specific nitrosamine arrested, to microwave radiation.

In another embodiment, the present invention is directed to a method for reducing the content of at least one tobacco-specific nitrosamine in cured brown tobacco, comprising rehydrating the cured brown tobacco, and subjecting the rehydrated tobacco to microwave radiation at a predetermined energy level for a predetermined length of time.

Similarly, the present invention includes within its scope a tobacco product comprising cured brown tobacco having a reduced content of at least one tobacco-specific nitrosamine, produced by a process comprising rehydrating the cured brown tobacco, and subjecting the rehydrated tobacco to microwave radiation at a predetermined energy level for a predetermined length of time.

In yet another embodiment, the present invention relates to a method of manufacturing a tobacco product, comprising subjecting harvested tobacco leaves to microwave radiation, while said leaves are uncured and in a state susceptible to having the amount of tobacco-specific nitrosamines reduced or formation of tobacco-specific nitrosamines arrested, for a sufficient time to reduce the amount of or substantially prevent formation of at least one tobacco-specific nitrosamine in the leaves, and forming the tobacco product comprising the microwaved leaves, the tobacco product being selected from cigarettes, cigars, chewing tobacco, snuff and tobacco-containing gum and lozenges.

BRIEF DESCRIPTION OF THE DRAWINGS

The file of this patent contains at least one color drawing. Copies of this patent with color drawings will be provided by the Patent and Trademark upon request and payment of the necessary fee.

DETAILED DESCRIPTION OF THE INVENTION

Figure 1:
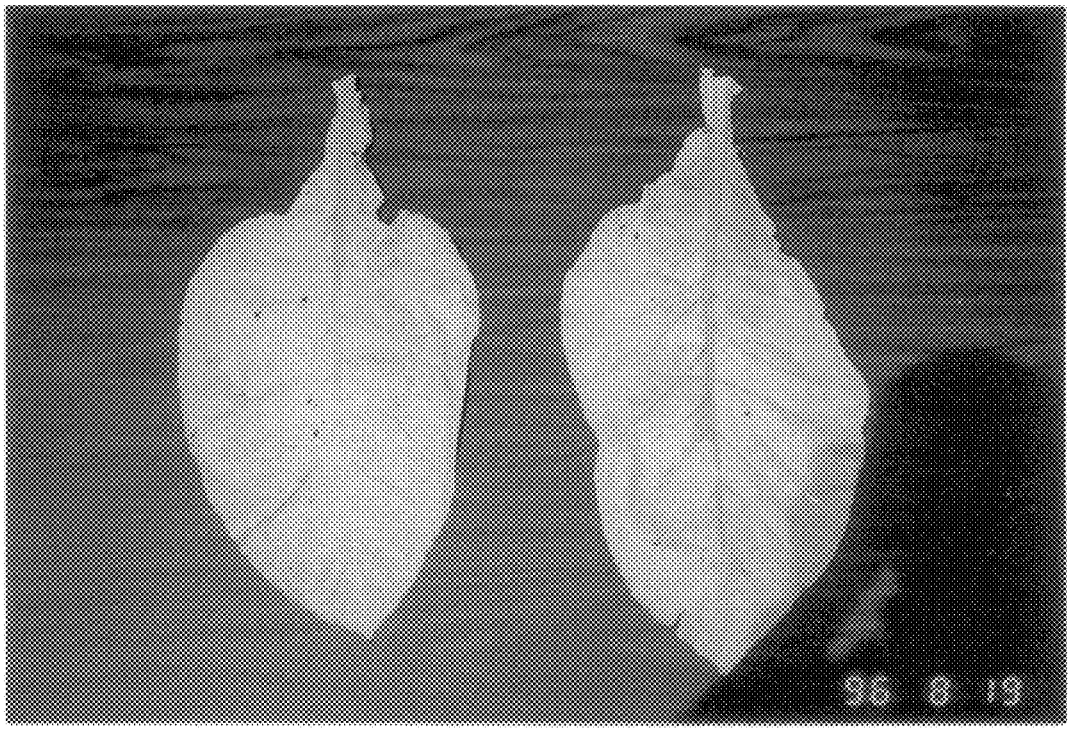
FIG. 1 is a photograph illustrating "yellow" Virginia flue tobacco aged 24 to 72 hours post-harvest.

It has been said that the practice of tobacco curing is more of an art than a science, because curing conditions during any given cure must be adjusted to take into account such factors as varietal differences, differences in leaves harvested from various stalk positions, differences among curing barns where used, and environmental variations during a single season or over different seasons, especially weather fluctuations when air-curing. For example, the practice of flue curing is empirical to a certain degree, and is optimally carried out by individuals who have accumulated experience in this art over a significant period of time. See, e.g., Peele et al, "Chemical and Biochemical Changes During The Flue Curing Of Tobacco," Recent Advances In Tobacco Science, Vol. 21, pp. 81 et seq., Symposium Proceedings 49th Meeting Chemists' Research Conference, Sep. 24–27, 1995, Lexington, Ky. (hereinafter "Peele et al"). Thus, one of ordinary skill in the art of tobacco curing would understand that the outer parameters of the present invention, in its broadest forms, are variable to a certain extent depending on the precise confluence of the above factors for any given harvest.

In one preferred embodiment, the present invention is founded on the discovery that a window exists during the tobacco curing cycle, in which the tobacco can be treated in a manner that will essentially prevent the formation of TSNA. Of course, the precise window during which TSNA formation can be effectively eliminated or substantially reduced depends on the type of tobacco, method of curing, and a number of other variables, including those mentioned above. In accordance with this preferred embodiment of the present invention, the window corresponds to the time frame post-harvest when the leaf is beyond the fresh-cut or "green" stage, and prior to the time at which TSNAs and/or nitrites substantially accumulate in the leaf; this time frame typically corresponds to the period in which the leaf is undergoing the yellowing process or is in the yellow phase, before the leaf begins to turn brown, and prior to the substantial loss of cellular integrity. Unless otherwise clear from the context, the terms "substantial" and "significant" as used herein generally refer to predominant or majority on a relative scale, give or take. During this time frame, the leaves are susceptible to having the formation of TSNAs substantially prevented, or the content of any already formed TSNAs reduced, by exposing the tobacco to microwave radiation at a predetermined energy level for a predetermined length of time, as discussed further below. This microwave treatment essentially arrests the natural formation of TSNAs, and provides a dried, golden yellow leaf suitable for human consumption. If TSNAs have already begun to substantially accumulate, typically toward the end of the yellow phase, the application of microwave energy to the leaf in accordance with the invention effectively arrests the natural TSNA formation cycle, thus preventing any further substantial formation of TSNA. When yellow or yellowing tobacco is treated in this fashion at the most optimal time in the curing cycle, the resulting tobacco product has TSNA levels essentially approximating those of freshly harvested green tobacco, while maintaining its flavor and taste.

In another embodiment, the present invention relates to treatment of cured (brown) tobacco to effectively reduce the TSNA content of that cured tobacco, by rehydrating cured tobacco and subjecting the rehydrated cured tobacco to microwave radiation, as described further below.

The present invention is applicable to treatment of the harvested tobacco which is intended for human consumption. Much research has been performed on tobacco, with particular reference to tobacco-specific nitrosamines. Freshly harvested tobacco leaves are called "green tobacco" and contain no known carcinogens, but green tobacco is not suitable for human consumption. The process of curing green tobacco depends on the type of tobacco harvested. For example, Virginia flue (bright) tobacco is typically flue-cured, whereas Burley and certain dark strains are usually air-cured. The flue-curing of tobacco typically takes place over a period of five to seven days compared to one to two+ months for air-curing. According to Peele et al, flue-curing has generally been divided into three stages: yellowing (35–40° C.) for about 36–72 hours (although others report that yellowing begins sooner than 36 hours, e.g., at about 24 hours for certain Virginia flue strains), leaf drying (40–57° C.) for 48 hours, and midrib (stem) drying (57–75° C.) for 48 hours. Many major chemical and biochemical changes begin during the yellowing stage and continue through the early phases of leaf drying.

In a typical flue-curing process, the yellowing stage is carried out in a barn. During this phase the green leaves gradually lose color due to chlorophyll degradation, with the corresponding appearance of the yellow carotenoid pigments. According to the review by Peele et al, the yellowing stage of flue-curing tobacco is accomplished by closing external air vents in the barn, and holding the temperature at approximately 35°–37° C. This process utilizes a controlled environment, maintains the relative humidity in the barn at approximately 85%, limits moisture loss from the leaves, and allows the leaf to continue the metabolic processes begun in the field. The operator constantly monitors the progress of the cure, primarily by observing the loss of chlorophyll and green color from the leaves, and the development of the desired lemon to golden orange leaf color.

With one particular variety of Virginia flue tobacco on which testing has been carried out as described herein, freshly harvested green tobacco is placed in a barn for about 24–48 hours at about 100–110° F. until the leaves turn more or less completely yellow (see FIG. 1). The yellow tobacco has a reduced moisture content, i.e., from about 90 weight % when green, versus about 70–40 weight % when yellow. At this stage, the yellow tobacco contains essentially no known carcinogens, and the TSNA content is essentially the same as in the fresh-cut green tobacco. This Virginia flue tobacco typically remains in the yellow stage for about 6–7 days, after which time the leaves turn from yellow to brown. The brown Virginia flue tobacco typically has a moisture content of about 11 to about 15 weight percent. The conversion of the tobacco from yellow to brown results in formation and substantial accumulation of nitrosamines, and an increased microbial content. The exact mechanism by which tobacco-specific nitrosamines are formed is not clear, but is believed to be enhanced by microbial activity, involving microbial nitrate reductases in the generation of nitrite during the curing process.

Tobacco-specific nitrosamines are believed to be formed upon reaction of amines with nitrite-derived nitrosating species, such as $NO_2$, $N_2O_3$ and $N_2O_4$ under acidic conditions. Weirnik et al discuss the postulated formation of TSNAs at pp. 43–45; a brief synopsis is set forth below.

Tobacco leaves contain an abundance of amines in the form of amino acids, proteins, and alkaloids. The tertiary amine nicotine (referenced as (1) in the diagram below) is the major alkaloid in tobacco, while other nicotine-type alkaloids are the secondary amines nornicotine (2), anatabine (3) and anabasine (4). Tobacco also generally contains up to 5% of nitrate and traces of nitrite.

Nitrosation of nornicotine (2), anatabine (3), and anabasine (4) gives the corresponding nitrosamines: N'-nitrosonornicotine (NNN, 5), N'-nitrosoanatabine (NAT, 6), and N'-nitrosoanabasine (NAB, 7). Nitrosation of nicotine (1) in aqueous solution affords a mixture of 4-(N-nitrosomethylamino)-1-(3-pyridyl)-1-butanone (NNK, 8) (NNN, 5) and 4-(N-nitrosomethylamino)-4-(3-pyridyl)-1-butanal (NNA, 9). Less commonly encountered TSNAs include NNAL (4-N-nitrosomethylamino)-1-(3-pyridyl)-1-butanol, 10), iso-NNAL (4-N-nitrosomethylamino)-4-(3-pyridyl)-1-butanol, 11) and iso-NNAC (4-(N-nitrosomethylamino)-4-(3-pyridyl)-butanoic acid, 12). The formation of these TSNAs from the corresponding tobacco alkaloids is shown schematically below, using the designations 1–12 above (reproduced from Weirnik et al, supra, p. 44):

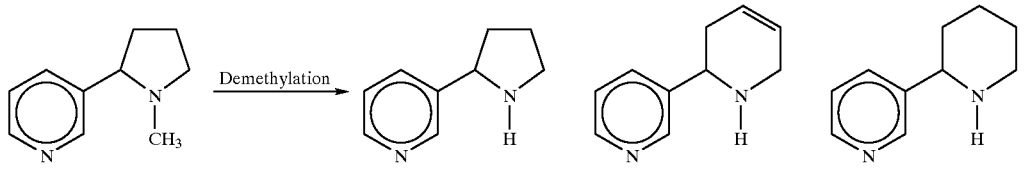

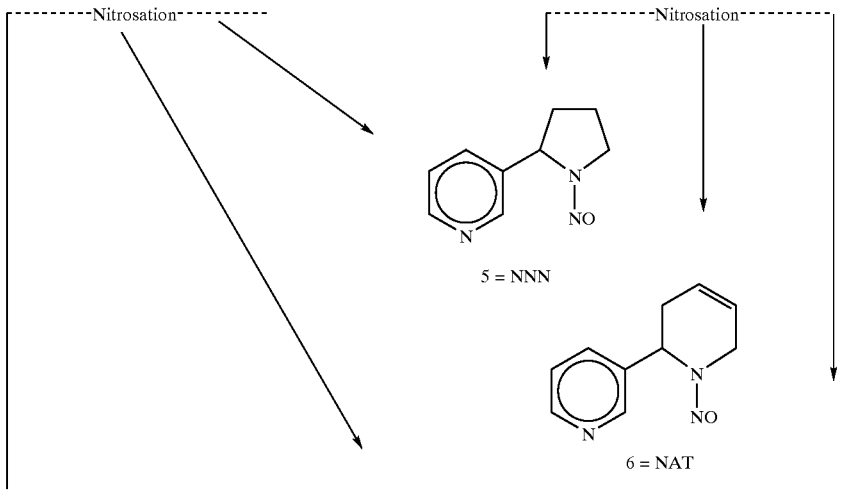

-continued

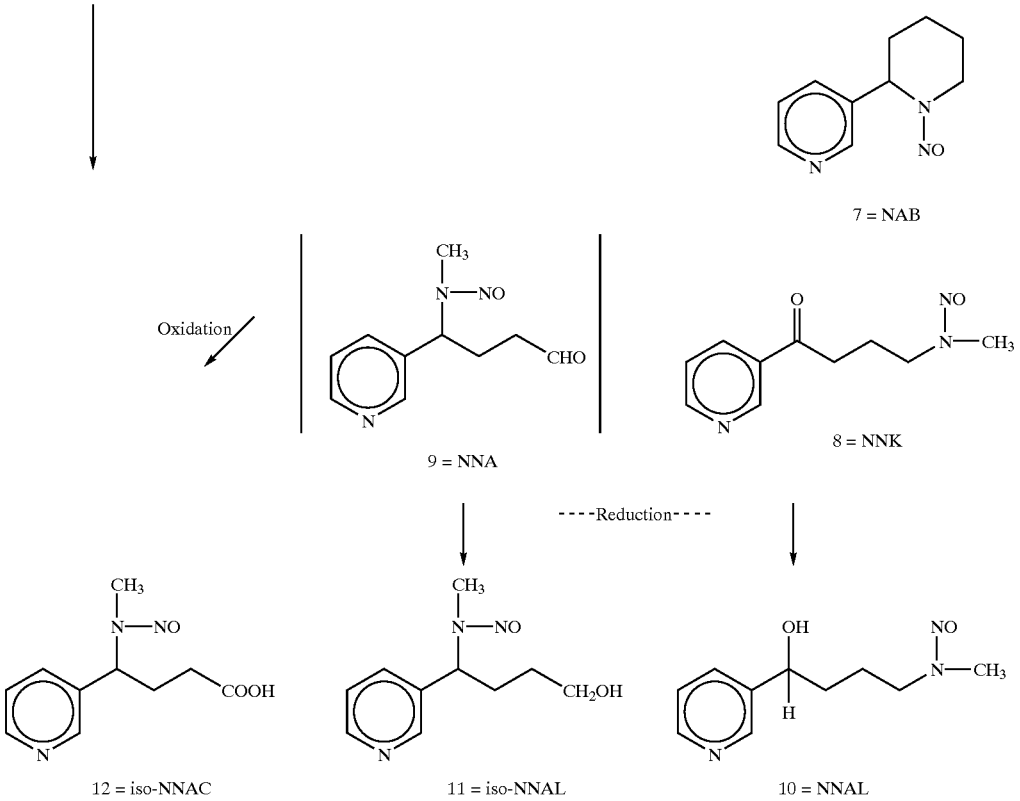

It is now generally agreed that green, freshly harvested tobacco contains virtually no nitrite or TSNA, and that these compounds are generated during curing and storage of tobacco. Studies have been made during the past decade to try to determine the events related to the formation of TSNA during curing of tobacco, and several factors of importance have been identified. These include plant genotype, plant maturity at harvest, curing conditions and microbial activity.

Studies have shown that nitrite and TSNA accumulate on air-curing at the time intervals starting after the end of yellowing and ending when the leaf turns completely brown, e.g., 2–3 weeks after harvest for certain air-cured strains, and approximately a week or so after harvest in flue-cured varieties. This is the time during which loss of cellular integrity occurs, due to moisture loss and leakage of the content of cells into the intercellular spaces. Therefore, there is a short window in time during air-curing when the cells have disintegrated, making the nutrition available for microorganisms. Weirnik et al have suggested that nitrite may then substantially accumulate as a result of dissimilatory nitrate reduction, thus rendering formation of TSNA possible.

There are a few published reports on the effects of microbial flora on the tobacco leaf during growth and curing and on cured tobacco, as cited in Weirnik et al. However, the involvement of microbial nitrite reductases in the generation of nitrate during curing is presumed. When cell structure is broken down after the yellow phase, and nutrients are made accessible to invading microorganisms, these may produce nitrite under favorable conditions, i.e., high humidity, optimal temperature and anoxia. There is normally a rather short "window" in time when the water activity is still sufficiently high, and the cell structure has disintegrated.

In accordance with the present invention, the formation of TSNAs in tobacco is substantially prevented or arrested by subjecting the harvested leaves to microwave radiation under the conditions described herein. In one preferred embodiment, the tobacco leaves are exposed to the microwave energy at a time between the onset of yellowing and the substantial loss of cellular integrity. For optimal results, it is preferred to pass the harvested leaves through the microwave field as single leaves, as opposed to stacks or piles of leaves. Treating the leaves in this manner has been determined to completely or substantially prevent the formation of tobacco-specific nitrosamines, including the known carcinogens NNN and NNK.

In accordance with preferred embodiments of the present invention, non-green and/or yellow tobacco products can be obtained which are suitable for human consumption, and which have a lower content of at least one tobacco-specific nitrosamine than conventionally cured tobacco. Green or fresh-cut tobacco is generally unsuitable for human consumption as noted above; "non-green" as used herein means means the tobacco has at least lost the majority of chlorophyll, and includes without limitation partially yellow leaves, full yellow leaves, and leaves which have begun to turn brown in places. In preferred embodiments, the non-green tobacco product has a TSNA (NNN, NNK, NAB and NAT) content of less than 0.2 $\mu$g/g, more preferably less than about 0.15 $\mu$g/g, and even more preferably less than about 0.1 $\mu$g/g, an NNN content of less than about 0.15 $\mu$g/g, more preferably less than about 0.10 $\mu$g/g, and even more preferably less than about 0.05 $\mu$g/g, and an NNK content of less than about 0.002 $\mu$g/g, more preferably less than about 0.001 $\mu$g/g, and even more preferably less than about 0.0005 $\mu$g/g. As noted above, given the number of factors which can influence TSNA formation in tobacco, one of ordinary skill in the art would understand that these numbers are not absolute, but rather preferred ranges.

The present invention is also directed to a tobacco product comprising dried yellow tobacco suitable for human consumption and having a lower content of at least one tobacco-specific nitrosamine than conventionally cured tobacco. In preferred embodiments, the yellow tobacco product has a TSNA (NNN, NNK, NAB and NAT) content, an NNN content, and an NNK content within the above preferred ranges.

In other embodiments, the non-green or yellow tobacco product comprises non-green or yellow tobacco suitable for human consumption, and having a TSNA (NNN, NNK, NAB and NAT) content within about 25% by weight of the content of such TSNA in the freshly harvested green tobacco crop from which the product was made. It is more preferred that the non-green or yellow tobacco product have a TSNA content within about 10% by weight, more preferably within about 5% by weight and most preferably essentially approximating (e.g. within an amount up to several percent by weight) the content of such TSNA in the freshly harvested tobacco crop from which the product was made. For example, the present invention permits tobacco products to be made which have a TSNA content within the above-described ranges as to amounts, whereas normally cured tobacco from the same crop would typically generate many times the amount of TSNA in the fresh-cut tobacco. The present invention can effectively lock in the low amounts of nitrosamines found in fresh-cut green tobacco. It is also preferred that the non-green or yellow tobacco product comprises non-green or yellow tobacco suitable for human consumption, and having content of at least one TSNA selected from NNN, NNK, NAB and NAT, which is within about 25% by weight of, preferably within about 10% by weight of, more preferably within about 5% by weight of, and most preferably essentially approximating (e.g., within an amount up to several percent by weight) the content of the corresponding TSNA or TSNAs in the freshly harvested green tobacco crop from which the product was made. In other words, the content of, e.g., NNN in the tobacco of the invention falls within the above ranges vis-a-vis the amount of NNN in the fresh-cut green tobacco, or the amount of NNN+NNK in the tobacco of the invention falls within the above ranges vis-a-vis the amount of NNN+NNK in the fresh-cut green tobacco, etc. In making these comparisons, the fresh-cut green tobacco is preferably analyzed for TSNA content within about 24 hours after harvest.

In yet additional embodiments of the invention, the non-green or yellow tobacco product comprises non-green or yellow tobacco suitable for human consumption, and having a TSNA (NNN, NNK, NAB and NAT) content which is at least about 75% by weight, preferably at least about 90% by weight, more preferably at least about 95% by weight, and most preferably at least about 99% by weight lower than the content of such TSNA in a tobacco product of the same type made from the same tobacco crop as the product of the invention, but which was cured in the absence of microwave radiation or other steps specifically designed to reduce the TSNA content. It is also preferred that the non-green or yellow tobacco product comprises non-green or yellow tobacco suitable for human consumption, and having a content of at least one TSNA selected from NNN, NNK, NAB and NAT which is at least about 75% by weight, preferably at least about 90% by weight, more preferably at least about 95% by weight, and most preferably at least about 99% by weight lower than the content of the corresponding TSNA or TSNAs in a tobacco product of the same type (e.g., comparing a cigarette to another cigarette) made from the same tobacco crop as the product of the invention, but which was cured in the absence of microwave radiation or other techniques for reducing TSNA content. In these embodiments, the TSNA weight % comparisons can be made by taking, for example, a cigarette made using dried yellow tobacco in accordance with the present invention, and taking a cigarette made from tobacco from the same crop as the dried yellow tobacco was made from, but curing it by conventional means without subjecting it to microwave radiation.

The yellow stage, in which the step of subjecting the tobacco leaf to microwave radiation is preferably carried out, can be broadly defined in any one of the following ways: (a) by examining the color of the leaf, when the green color has substantially given way to a yellowish color; (b) by measuring the percent of chlorophyll conversion to sugars; (c) by observing the onset of either nitrite formation or nitrosamine generation, which typically coincide with the end of the yellow phase, or (d) by measuring the moisture content of the leaves, e.g., when they have a moisture content from about 40 to about 70 percent by weight. If the microwave radiation is applied to green tobacco, the arrestation or prevention of nitrosamine formation is not observed. However, when microwave energy is applied after the onset of yellowing and prior to the loss of cellular integrity or substantial accumulation of TSNAs in the leaf, the observed reduction in the amount of, or prevention of formation of nitrosamines is dramatic and unexpected, as shown by the data discussed below.

The optimal time for subjecting the harvested tobacco to the microwave radiation during the yellow phase varies depending on a number of factors, including varietal differences, environmental variations, etc. Thus, within the time frame beginning with onset of yellowing (defined, e.g., by a loss of the majority of green color in the leaf) through the time at which the leaf substantially loses cellular integrity (as it turns brown), one of ordinary skill in the art could determine the optimal time for carrying out the microwave treatment for any given variety of tobacco. For example, for a given genotype, sample leaves could be tested by the procedures described herein to measure either nitrite or TSNA content, to identify the relative time in a given cure cycle at which significant TSNA accumulation begins, or identify the transition phase in which loss of cellular integrity occurs. While subjecting the leaves to the microwave radiation prior to significant TSNA accumulation is the most preferred form of the method of the present invention, the principles of the invention can also be applied to tobacco leaves which are in the process of forming, and have already accumulated significant amounts of TSNAs. When the microwaving is carried out at this latter stage, further formation of TSNAs can be effectively arrested. However, once the leaves are fully cured, TSNA levels have essentially stabilized, and application of microwave radiation is ineffective to reduce the TSNA context, except under rehydration conditions described below.

Upon being subjected to microwave radiation in accordance with the present invention, the tobacco leaf generally has a reduced moisture content, i.e. less than about 10% by weight, and often approximately 5%. If desired, the leaf can be rehydrated back to the typical moisture range for brown, cured tobacco (e.g., about 11–15% for Virginia flue) before manufacturing into tobacco products such as cigarettes.

The present invention is applicable to all strains of tobacco, including flue or bright varieties, Burley varieties, dark varieties, oriental/Turkish varieties, etc. Within the guidelines set forth herein, one of ordinary skill in the art could determine the most efficient time in the cure cycle for carrying out the microwave step to achieve the object and advantages of the present invention.

Preferred aspect of the process include a step, prior to subjecting a tobacco leaf which preferably includes the stem to microwave radiation, of physically pressing the leaf to squeeze excess moisture therefrom, to ensure more uniform drying by the microwave unit. This step can be conveniently carried out by passing the leaf through a pair of appropriately spaced rotating cylindrical rollers prior to entering the microwave cavity. Such a pressing step will aid in wringing moisture from the stem and, to a lesser extent, the midrib and larger veins, and lead to a better and more evenly dried product. The rollers can be made of hard rubber, plastic or steel and be of any desired length, and are preferably spaced about one-eighth to about one-quarter inch apart, but the distance is preferably selected so as to accomodate the thickness of a single leaf, which can vary. The rollers can be belt or chain driven by an appropriately selected motor. Besides rotating rollers, other types of squeezing or pressing means could be used to accomplish the same result, if desired, as would be apparent to one of ordinary skill in the art.

The above-described preferred embodiment of pressing the leaves permits more high-speed production to be carried out, since the stems do not have to be cut out, and the microwave time can be reduced. This embodiment is particularly advantageous for tobacco leaves destined to be used in cigarettes, which typically contain some tobacco stems as part of a blend. Alternatively, the pressing step can be omitted if desired, in applications where the stem is trimmed from the leaves and discarded.

The principles of the present invention can also be applied to brown or already cured tobacco, which has been rehydrated. In such cases, while important and unexpected reductions in the amount of the TSNAs, particularly NNN and NNK, are observed when rehydrated brown tobacco is subjected to microwave radiation, the results are not as dramatic as when the invention is applied to uncured yellow tobacco, prior to the time when substantial quantities of TSNAs or nitrites have accumulated in the leaves. Nonetheless the addition of moisture to the cured leaves, such as by spraying with enough water to effectively soak the leaves, followed by microwaving the rehydrated leaves, reduces the content of TSNAs as demonstrated in the following Examples.

As noted above, when treating cured or brown tobacco, microwaving alone has little effect on the nitrosamine content. However, it has been determined that rehydration of the cured tobacco prior to subjecting it to microwave radiation facilitates the action of the microwave energy in reducing nitrosamines. In one preferred embodiment, the cured tobacco product is rehydrated by adding an appropriate amount of water, generally at least about 10% by weight, up to the maximum absorption capacity, directly to the leaves. Exposure of the rehydrated leaves to microwave radiation, in the same manner as described herein with regard to the uncured tobacco, reduces the nitrosamine content, as shown below. The leaves can be wetted in any suitable fashion. If the cured tobacco is in a form other than leaves, such as reconstituted "sheet" tobacco, it can similarly be rehydrated with, e.g., 10–70% by weight water, and then microwaved. Suitable microwave condition can be selected depending on the degree to which the leaves are re-wetted, but typically fall within the parameters discussed above for microwaving yellow tobacco.

In accordance with the present invention, microwaving of the rehydrated brown tobacco can preferably reduce the TSNA (NNN, NNK, NAB and NAT) content, measured individually or collectively, by at least about 25% by weight, more preferably by at least about 35% by weight, and even more preferably by at least about 50% by weight from the TSNA levels contained the cured brown tobacco prior to rehydration.

The term "microwave radiation" as used herein refers to electromagnetic energy in the form of microwaves having a frequency and wavelength typically characterized as falling within the microwave domain. The term "microwave" generally refers to that portion of the electromagnetic spectrum which lies between the far-infrared region and the conventional radiofrequency spectrum. The range of microwaves extends from a wavelength of approximately 1 millimeter and frequency of about 300,000 MHz to wavelength of 30 centimeters and frequency of slightly less than about 1,000 MHz. The present invention preferably utilizes high power applications of microwaves, typically at the lower end of this frequency range. Within this preferred frequency range, there is a fundamental difference between a heating process by microwaves and by a classical way, such as by infrared (for example, in cooking): due to a greater penetration, microwaves generally heat quickly to a depth several centimeters while heating by infrared is much more superficial. In the United States, commercial microwave apparatuses, such as kitchen microwave ovens, are available at standard frequencies of approximately 915 MHz and 2450 MHz, respectively. These frequencies are standard industrial bands. In Europe, microwave frequencies of 2450 and 896 MHz are commonly employed. Under properly balanced conditions, however, microwaves of other frequencies and wavelengths would be useful to achieve the objects and advantages of the present invention.

Microwave energy can be generated at a variety of power levels, depending on the desired application. Microwaves are typically produced by magnatrons, at power levels of 600–1000 watts for conventional kitchen-level microwave apparatuses (commonly at about 800 watts), but commercial units are capable of generating power up to several hundred kilowatts, generally by addition of modular sources of about 1 kilowatt. A magnatron can generate either pulsed or continuous waves of suitably high frequency.

The applicator (or oven) is a necessary link between the microwave power generator and the material to be heated. For purposes of the present invention, any desired applicator can be used, so long as it is adapted to permit the tobacco plant parts to be effectively subjected to the radiation. The applicator should be matched to the microwave generator to optimize power transmission, and should avoid leakage of energy towards the outside. Multimode cavities (microwave ovens), the dimensions of which can be larger than several wavelengths if necessary for large samples, are useful. To ensure uniform heating in the leaves, the applicator can be equipped with a mode stirrer (a metallic moving device which modifies the field distribution continuously), and with a moving table surface, such as a conveyor belt. The best results are attained by single leaf thickness exposure to microwave radiation, as opposed to stacks or piles of leaves.

In preferred embodiments of the invention, the microwave conditions comprise microwave frequencies of about 900 MHz to about 2500 MHz, more preferably about 915 MHz and about 2450 MHz, power levels of from about 600 watts up to 300 kilowatts, more preferably from about 600 to about 1000 watts for kitchen-type applicators and from about 2 to about 75 kilowatts, more preferably from about 5 to about 50 kilowatts, for commercial multimode applicators. The heating time generally ranges from at least about 1 second, and more generally from about 10 seconds up to about 5 minutes. At power levels of about 800–1000 watts the heating time is preferably from about 1 minute to about 2½ minutes when treating single leaves as opposed to piles or stacks. For commercial-scale applicators using higher power levels in the range of, e.g., 2–75 kilowatts, heating times would be lower, ranging from about 5 seconds up to about 60 seconds, and generally in the 10–30 second range at, say, 50 kilowatts, again for single leaves as opposed to piles or stacks. Of course, one of ordinary skill in the art would understand that an optimal microwave field density could be determined for any given applicator based on the volume of the cavity, the power level employed, and the amount of moisture in the leaves. Generally speaking, use of higher power levels will require less time during which the leaf is subjected to the microwave radiation.

However, the above-described conditions are not absolute, and given the teachings of the present invention, one of ordinary skill in the art would be able to determine appropriate microwave parameters. The microwave radiation is preferably applied to the leaf or portion thereof for a time sufficient to effectively dry the leaf, without charring, so that it is suitable for human consumption. It is also preferred to apply the microwave radiation to the leaf or portion thereof for a time and at a power level sufficient to reduce the moisture content to below about 10% by weight.

Figure 2:
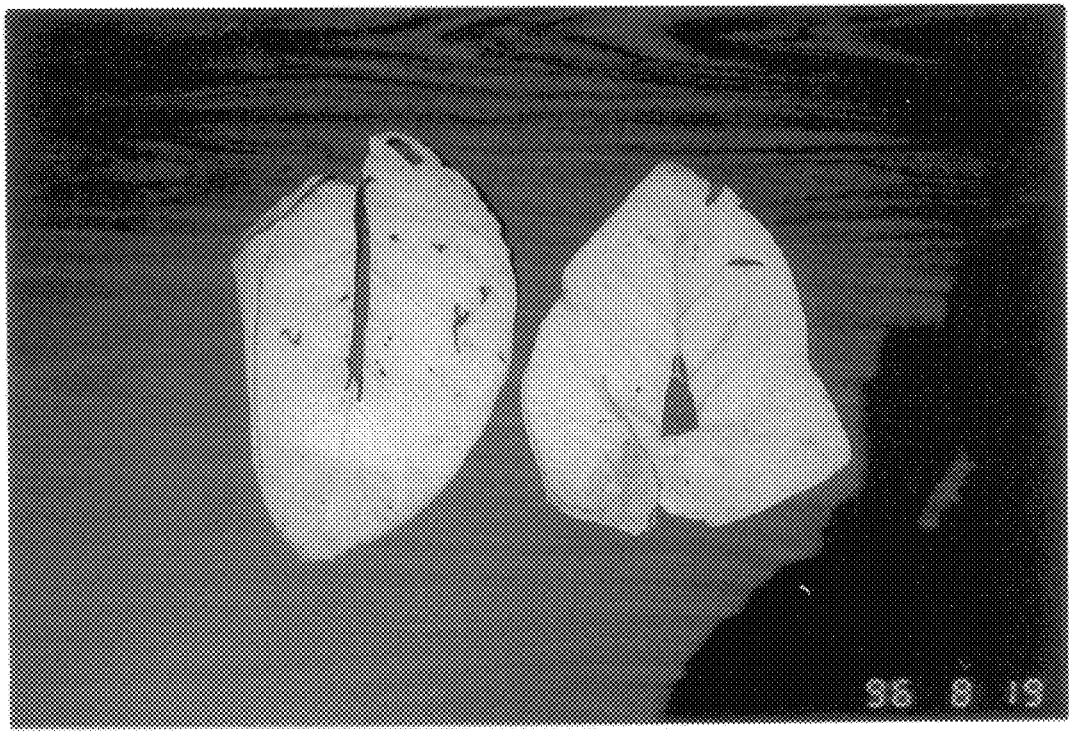
FIG. 2 is a photograph illustrating low-nitrosamine microwaved "yellow" Virginia flue tobacco in accordance with the present invention.

As disclosed in FIG. 2, the microwave treatment of yellow tobacco in accordance with the present invention preferably results in a dried, golden-colored tobacco product. The data presented herein establish that such dried tobacco, in its unsmoked form, has dramatically reduced carcinogenic nitrosamines, particularly NNN and NNK, as opposed to normally cured tobacco.

Subjecting the uncured tobacco to microwave energy is demonstrated herein to be effective to provide tobacco have surprisingly low nitrosamine contents. The technique of microwaving can be facilitated by peeling and disposing of the stem down one-third to one-half length of the tobacco leaf, especially in cases where the stem is to be discarded and the moisture-wringing step described above. Where the stem is removed in this manner, the resultant microwaved tobacco leaf does not require the use of a thrasher machine since the undesirable part of the stem is already removed. As a result, the typical loss of tobacco product associated with thrashing is eliminated, reducing tobacco waste by approximately 10% to 30%.

The improved tobacco of the present invention can be substituted in whole or part for normally-cured tobacco in any tobacco product, including cigarettes, cigars, chewing tobacco, tobacco chewing gum, tobacco lozenges, tobacco pouches, snuff, or tobacco flavoring and food additives. For the purposes of smoking, the present invention provides a less noxious odor while maintaining good smoking characteristics and providing full flavor with normal nicotine content. For the purposes of chewing, snuff, pouch and food additives, the tobacco of the present invention has a rich, pleasant flavor.

The present invention is now illustrated by reference to the following examples, which are not intended to limit the scope of the invention in any manner.

EXAMPLE 1

Virginia flue tobacco was harvested, and the leaves were placed in a curing barn at about 100–110° F. to begin the flue-curing process. Samples 1–3 were taken from the barn after the leaves had turned yellow, about 24–36 hours post-harvest. Sample 1 was a lamina sample, stripped of the midrib, and baked in a convection air oven at about 400–500° C. for about 1 hour, which browned the lamina. Sample 2 was a yellow leaf, placed in a Goldstar Model MA-1572M microwave oven (2450 MHz), and heated on the high power setting (1,000 watts) while rotating for about 2½ minutes. Sample 3 was a yellow leaf, untreated, used as a control. Samples 4 and 5 remained in the curing barn under elevated temperature of about 180° F., Sample 4 being dried outside the racks and Sample 5 inside the racks. Sample 6 was a cured, brown leaf, having underwent the normal flue-cure process.

Analyses were performed on each sample to determine NNN, NAT, NAB and NNK contents. In this and the following examples, "TSNA" represents the sum of these four tobacco-specific nitrosamines. Sample work-up and extraction followed a typical procedure for analysis of TSNAs (see, for example, Burton et al., "Distribution of Tobacco Constituents in Tobacco Leaf Tissue. 1. Tobacco-specific Nitrosamines, Nitrate, Nitrite and Alkaloids", J. Agric. Food Chem., Volume 40, No. 6, 1992), and individual TSNAs were quantified on a Thermedics Inc. TEA Model 543 thermal energy analyzer coupled to a Hewlett-Packard Model 5890A gas chromatograph. The results are shown in Table 1 below. All data in each table below are presented in micrograms of the nitrosamine per gram of sample (i.e., parts per million or $\mu$g/g):

TABLE 1

| Sample # | NNN | NAT + NAB | NNK | TSNA |
|---|---|---|---|---|
| 1 - yellow baked lamina | 0.0310 | 0.843 | <0.0004 | 0.1157 |
| 2 - yellow microwaved | <0.0004 | <0.0006 | <0.0005 | <0.0014 |
| 3 - yellow control | 0.0451 | 0.1253 | 0.0356 | 0.2061 |
| 4 - rapid drying outside racks | 0.6241 | 1.4862 | 1.2248 | 3.3351 |
| 5 - rapid drying inside racks | 0.7465 | 1.5993 | 1.3568 | 3.7044 |
| 6 - regular flue-cured | 1.0263 | 1.7107 | 2.2534 | 4.9904 |

EXAMPLE 2

Virginia flue tobacco was harvested. Sample 7 was a fresh-cut, green leaf used as a control, while Sample 8 was a fresh-cut green leaf which was subjected to microwave radiation in a multimode microwave applicator manufactured by MicroDry of Louisville, Ky., operating at 2450 MHz at 2.5 kilowatts, for about 20 seconds. Samples 9–12 were made from normally flue-cured brown tobacco. Sample 9 was tobacco from a formed cigarette; Sample 10 was loose, shredded tobacco for making cigarettes; Samples 11 and 12 were the same as Samples 9 (cigarette) and 10 (loose), respectively, except that each was subjected to the same microwave conditions as Sample 8. TSNA contents were analyzed in the same manner as in Example 1. The results are shown in Table 2 below:

TABLE 2

| Sample # | NNN | NAT + NAB | NNK | TSNA |
|---|---|---|---|---|
| 7 - fresh leaf control | <0.0104 | 0.126 | 0.0005 | 0.126 |
| 8 - fresh leaf - microwaved | 0.029 | 0.135 | 0.0004 | 0.164 |
| 9 - control cigarette | 1.997 | 3.495 | 2.735 | 8.226 |
| 10 - control loose | 2.067 | 3.742 | 2.982 | 8.791 |
| 11 - cigarette microwaved | 2.056 | 3.499 | 2.804 | 8.359 |
| 12 - loose microwaved | 2.139 | 3.612 | 2.957 | 8.707 |

EXAMPLE 3

The following cigarette brands shown in Table 3 were purchased at random at various retailers in Lexington, Ky., and analyzed for TSNA content using the procedure described in Example 1:

TABLE 3

| Sample # | Code No. | NNN | NAT + NAB | NNK | TSNA |
|---|---|---|---|---|---|
| 13-Marlboro-king-pc | 288292 | 3.565 | 4.538 | 1.099 | 9.202 |
| 14-Marlboro-king-pc | 288292 | 4.146 | 4.992 | 1.142 | 10.279 |
| 15-Marlboro-king-pc | 288292 | 3.580 | 4.290 | 1.106 | 8.977 |
| 16-Marlboro-king-pc | 288292 | 3.849 | 4.748 | 1.130 | 9.728 |
| 17-Marlboro-lights-100's-bx | 288192 | 4.604 | 5.662 | 1.223 | 11.489 |
| 18-Marlboro-lights-100's-pc | 288182 | 3.471 | 3.859 | 1.211 | 8.541 |
| 19-Marlboro-lights-100's-pc | 288182 | 3.488 | 4.136 | 1.074 | 8.698 |
| 20 Marlboro-lights-100's-pc | 288182 | 3.566 | 4.240 | 1.164 | 8.970 |
| 21-Winstron-100's-pc | 123143 | 2.311 | 2.968 | 1.329 | 6.608 |
| 22-Winston-king | 123103 | 2.241 | 2.850 | 1.256 | 6.348 |
| 23-Winston-king-bx | 125123 | 2.162 | 2.831 | 1.326 | 6.319 |
| 24-Winston-king-bx | 123123 | 2.577 | 3.130 | 1.207 | 6.914 |
| 25-Winston-king-pc | 123103 | 1.988 | 2.563 | 1.234 | 5.786 |

TABLE 3-continued

| Sample # | Code No. | NNN | NAT + NAB | NNK | TSNA |
|---|---|---|---|---|---|
| 26-Winston-lights-100'-pc | 123133 | 2.161 | 2.706 | 1.258 | 6.124 |
| 27-Winston-lights-100's-pc | 123133 | 2.189 | 2.699 | 1.262 | 6.150 |
| 28-Winston-lights-100's-pc | 123133 | 2.394 | 3.385 | 2.330 | 8.109 |

EXAMPLE 4

Virginia flue tobacco was harvested, and the leaves were placed in a curing barn at about 100–110° F. to begin the flue-curing process. After the leaves turned yellow, about 24–36 hours post-harvest, they were taken out of the barn and microwaved in Goldstar Model MA-1572M microwave oven (2450 MHz), high power setting (1000 watts), for about 2½ minutes while rotating. The leaves were effectively dried by this procedure, although they did not turn brown, but instead retained their golden-yellow color. The leaves were shredded and made into cigarettes. Samples 29–33 were taken from a batch labeled Red Full Flavor, while Samples 34–38 were taken from a batch labeled blue Light. Samples 39–42 were cigarettes purchased at a health food store, under the brand Natural American Spirit. Samples 29–42 were analyzed for TSNA content using the procedure described in Example 1, and the results are shown in Table 4 below:

TABLE 4

| Sample # | | NNN | NAT + NAB | NNK | TSNA |
|---|---|---|---|---|---|
| 29-RED FULL FLAVOR REP 1 | | 0.138 | 0.393 | <0.0005 | 0.532 |
| 30-RED FULL FLAVOR REP 2 | | 0.192 | 0.231 | <0.0005 | 0.423 |
| 31-RED FULL FLAVOR REP 3 | | 0.129 | 0.220 | <0.0007 | 0.349 |
| 32-RED FULL FLAVOR REP 4 | | 0.145 | 0.260 | <0.0007 | 0.406 |
| 33-RED FULL FLAVOR REP 5 | | 0.140 | 0.293 | <0.0006 | 0.434 |
| | AVG | 0.149 | 0.279 | <0.0006 | 0.429 |
| | STD | 0.022 | 0.062 | 0.0001 | 0.059 |
| 34-BLUE LIGHT REP 1 | | 0.173 | 0.162 | <0.0005 | 0.335 |
| 35-BLUE LIGHT REP 2 | | 0.046 | 0.229 | <0.0005 | 0.275 |
| 36-BLUE LIGHT REP 3 | | 0.096 | 0.188 | <0.0005 | 0.285 |

TABLE 4-continued

| Sample # | | NNN | NAT + NAB | NNK | TSNA |
|---|---|---|---|---|---|
| 37-BLUE LIGHT REP 4 | | 0.067 | 0.215 | <0.0005 | 0.282 |
| 38-BLUE LIGHT REP 5 | | 0.122 | 0.218 | <0.0005 | 0.341 |
| | AVG | 0.101 | 0.202 | <0.0005 | 0.304 |
| | STD | 0.044 | 0.024 | 0.0000 | 0.028 |
| 39-NATURAL AMERICAN SPIRIT | | 0.747 | 1.815 | 1.455 | 4.017 |
| 40-NATURAL AMERICAN SPIRIT | | 0.762 | 1.805 | 1.458 | 4.025 |
| 41-NATURAL AMERICAN SPIRIT | | 0.749 | 1.826 | 1.464 | 4.039 |
| 42-NATURAL AMERICAN SPIRIT | | 0.749 | 1.760 | 1.462 | 3.971 |
| | AVG | 0.752 | 1.802 | 1.460 | 4.013 |
| | STD | 0.006 | 0.025 | 0.004 | 0.025 |

STD in the Tables herein is the standard deviation for the average of the samples shown.

EXAMPLE 5

Virginia flue tobacco was harvested, and the leaves were placed in a curing barn at about 100–110° F. to begin the flue-curing process. Samples 43–44 were taken from the barn after the leaves had turned yellow, about 24–36 hours post-harvest, and subjected to microwave radiation in the MicroDry multimode applicator described above for about 20 and 30 seconds, respectively, at a power level of about 6 kilowatts. Samples 43 and 44 were dried, golden-yellow leaves after the microwaving. Samples 45–51 were made from brown, cured leaves having underwent the normal flue-cure process. Sample 45 was a control; Samples 46 and 47 were baked in a convection oven preheated to about 400–500° F. for about 1 and about 3 minutes, respectively; and Samples 48 and 49 were subjected to microwave radiation (915 MHz) in a Waveguide applicator Model WR-975, a large multimode oven manufactured by MicroDry (power settings from 0–75 KW) at 50 kilowatts for about 10 and 40 seconds, respectively. Samples 50 and 51 were cut (reconstituted sheet) tobacco made from the flue-cured leaves. Sample 50 was subjected to microwave radiation in the Waveguide microwave oven at 50 kilowatts for about 1.5 minutes, while Sample 51 was baked in a convection oven preheated to about 400–500° F. for about 3 minutes. These samples were analyzed for TSNA content using the procedure described in Example 1, and the results are shown in Table 5 below:

TABLE 5

| Sample # | NNN | NAT + NAB | NNK | TSNA |
|---|---|---|---|---|
| 43-20 SEC MICROWAVE | <0.0106 | <0.1068 | <0.0007 | <0.1181 |
| 44-30 SEC MICROWAVE | <0.0103 | <0.1065 | <0.0004 | <0.1172 |
| 45-CONTROL NO MICRO | 0.92 | 2.05 | 3.71 | 6.68 |

TABLE 5-continued

| Sample # | NNN | NAT + NAB | NNK | TSNA |
|---|---|---|---|---|
| 46-OVEN 1 MIN | 1.14 | 2.41 | 5.10 | 8.66 |
| 47-OVEN 3 MIN | 0.89 | 2.06 | 2.68 | 5.64 |
| 48-WAVEGUIDE 10 SEC 50 KW | 1.00 | 2.31 | 3.29 | 6.59 |
| 49-WAVEGUIDE 40 SEC 50 KW | 0.62 | 1.55 | 1.69 | 3.86 |
| 50-CUT TOBACCO WAVEGUIDE 1.5 MIN 50 KW | 4.22 | 4.91 | 0.99 | 10.12 |
| 51-CUT TOBACCO OVEN 3 MIN | 4.76 | 5.60 | 1.08 | 11.44 |

EXAMPLE 6

Virginia flue tobacco was harvested, and the leaves were placed in a curing bar at about 100–110° F. to begin the flue-curing process. Samples 52–55 were cigarettes made from yellow tobacco which had been pulled from the barn after about 24–36 hours, and subjected to Microwave radiation in a Goldstar microwave oven, Model MA-1572M (2450 MHz), for about 2 minutes on the high power setting (1000 watts). For comparison, Samples 61 and 62 were cigarettes made from leaves which had undergone the normal flue-cure process, without microwave treatment. Sample 56 was a cured leaf; Sample 57 was post-yellow, not fully cured; Sample 58 was a cured lamina, while Samples 59 and 60 were cured midribs. TSNA contents were measured as in Example 1, and the results are set forth in Table 6 below:

TABLE 6

| Sample # | NNN | NAT + NAB | NNK | TSNA |
|---|---|---|---|---|
| 52-Goldsmoke cigarettes | 0.12 | 0.23 | 0.03 | 0.38 |
| 53-Goldsmoke II, 85 mm | 0.062 | 0.326 | 0.016 | 0.404 |
| 54-Goldsmoke 85 mm | 0.128 | 0.348 | 0.029 | 0.504 |
| 55-Goldsmoke 100's Sample B | 0.166 | 0.317 | 0.047 | 0.531 |
| 56-Sample M-M | 3.269 | 4.751 | 0.833 | 8.853 |
| 57-Sample B-C | 0.267 | 0.720 | 0.954 | 1.941 |
| 58-Lamina M-C | 0.933 | 1.456 | 1.968 | 4.356 |
| 59-WM | 0.996 | 1.028 | 0.408 | 2.432 |
| 60-SM | 1.745 | 1.753 | 0.306 | 3.804 |
| 61-Goldsmoke control | 1.954 | 1.544 | 0.492 | 3.990 |

TABLE 6-continued

| Sample # | NNN | NAT + NAB | NNK | TSNA |
|---|---|---|---|---|
| 62-Goldsmoke control | 1.952 | 1.889 | 0.424 | 4.265 |

EXAMPLE 7

Virginia flue tobacco was harvested. Samples 63 and 66 were uncured, fresh-cut green tobacco, although over a week lapsed before TSNA measurements were taken, so some air-curing had taken place. The remaining leaves were placed in a curing barn at about 100–110° F. to begin the flue-curing process. Sample 68 was a leaf taken from the barn after it had turned yellow, about 24–36 hours post-harvest, and was subjected to microwave radiation in the Waveguide multimode applicator described above, for about 40 seconds at 25 kilowatts.

Samples 64/65 (leaves) and 67/70 (reconstituted sheet tobacco, or "cut" tobacco) demonstrate the effects of the present invention when cured tobacco is rehydrated, then subjected to microwave radiation. Samples 64 and 65 were leaf samples having undergone the normal flue-curing process; however, Sample 64 was rehydrated by running under an open faucet for about 5–10 seconds. The leaf absorbed significant moisture. Each of Samples 64 and 65 was then microwaved in the Waveguide multimode applicator for about 40 seconds at 25 kilowatts. Samples 67 and 70 were reconstituted sheet tobacco samples, made from cured leaves. Sample 67 was rehydrated by adding water so that a significant quantity was absorbed, then microwaved under the conditions described for Sample 64. Sample 70 was not microwaved. Samples 69, 71 and 72 are additional cured leaf samples, used as controls. The TSNA contents were measured as in Example 1, and the results are shown in Table 7 below:

TABLE 7

| Sample # | NNN | NAT + NAB | NNK | TSNA |
|---|---|---|---|---|
| 63-CONTROL UNCURED | 0.010 | 0.263 | 0.000 | 0.274 |
| 64-CURED 40 SEC (WET) | 0.737 | 1.252 | 1.893 | 3.882 |
| 65-CURED 40 SEC | 0.767 | 1.520 | 2.229 | 4.516 |
| 66-UNCURED 40 SEC | 0.010 | 0.261 | 0.000 | 0.272 |
| 67-CUT TOBACCO CURED 40 SEC (WET) | 0.769 | 1.328 | 0.308 | 2.405 |
| 68-UNCURED 40 SEC 25 KW WAVEGUIDE | 0.051 | 0.244 | 0.014 | 0.308 |
| 69-CURED CONTROl | 0.866 | 1.548 | 2.545 | 4.960 |
| 70-CONTROL CUT TOBACCO | 1.872 | 2.536 | 0.789 | 5.197 |
| 71-CONTROL 'AL' WHOLE LEAF | 0.230 | 0.606 | 0.746 | 1.582 |
| 72-SML WHOLE LEAF | 0.413 | 0.884 | 1.514 | 2.810 |

EXAMPLE 8

Virginia flue tobacco was harvested, and the leaves were placed in a curing barn at about 100–110° F. to begin the flue-curing process. Sample 73 was a leaf taken from the barn after it turned yellow, about 24–36 hours post-harvest, and microwaved in a Goldstar Model MA-1572M for about 2 minutes on the high setting. Samples 74–76 were flue-cured in the normal way. Sample 74 was a cured control. Samples 75 and 76 were rehydrated as in Example 7 (Sample 64), then each sample was subjected to microwave radiation in the MicroDry applicator (2450 MHz) for about 20 seconds (Sample 75) and about 40 seconds (Sample 76), respectively, at power levels of about 6 kilowatts. Samples 77–79 were reconstituted sheet tobacco, made from the flue-cured leaves. Sample 77 was a control, while Samples 78 and 79 were rehydrated as in Example 7 (Sample 67). Samples 78 and 79 were microwaved in the MicroDry applicator for about 30 seconds each; Sample 78 rested on the oven bottom, while Sample 79 was raised up several inches by resting the sheet sample on a styrofoam cup, which permitted more uniform heating. TSNA contents were measured as in Example 1, and the results are set forth in Table 8 below:

TABLE 8

| Sample # | NNN | NAT + NAB | NNK | TSNA |
|---|---|---|---|---|
| 73-yellow microwaved | 0.052 | 0.260 | <0.0004 | 0.313 |
| 74-A-control leaf, cured | 1.168 | 1.904 | 1.662 | 4.734 |
| 75-B-20 SECONDS | 0.791 | 1.705 | 1.115 | 3.611 |
| 76-C 40 SECONDS | 0.808 | 1.624 | 1.160 | 3.592 |
| 77-CONTROL-sheet | 4.417 | 3.697 | 0.960 | 9.073 |
| 78-30 SECONDS | 2.755 | 2.553 | 0.644 | 5.952 |
| 79-30 SECONDS ELEVATED | 1.606 | 1.732 | 0.350 | 3.687 |

EXAMPLE 9

Samples 80–81 were Redman chewing tobacco purchased at retail. Sample 80 was a control, while Sample 81 was microwaved in a Goldstar Model MA-1572M for about 1–2 minutes on the high power setting. Samples 82–83 were Skoal snuff purchased at retail. Sample 82 was a control, while Sample 83 was microwaved in the same manner as for Sample 81. TSNA contents were measured, and the results are shown in Table 9 below:

TABLE 9

| Sample # | NNN | NAT + NAB | NNK | TSNA |
|---|---|---|---|---|
| 80-CHEWING TOBACCO BEFORE | 0.712 | 0.927 | 0.975 | 1.713 |
| 81-CHEWING TOBACCO AFTER | 0.856 | 0.906 | 0.122 | 1.884 |
| 82-SNUFF BEFORE | 4.896 | 10.545 | 1.973 | 17.414 |
| 83-SNUFF AFTER | 6.860 | 14.610 | 1.901 | 23.370 |

EXAMPLE 10

To test whether TSNAs accumulate over time even after yellow tobacco is microwaved in accordance with the present invention, additional samples (designated -A) of the cigarettes tested in Example 4, Samples 29, 35 and 39 (control) were retested for TSNA content more than seven months after the TSNA contents were first measured, as reported in Example 4. The results are shown below in Table 10:

TABLE 10

| Sample # | NNN | NAT | NAB | NNK | TSNA |
|---|---|---|---|---|---|
| 29A-RED FF REP #1 | 0.1109 | 0.1877 | 0.1078 | 0.0015 | 0.4079 |
| 35A-BLUE LIGHT REP #2 | 0.0508 | 0.1930 | 0.1075 | 0.0012 | 0.3525 |
| 39A-NATURAL AMERICAN SPIRIT REP #1 | 0.6151 | 1.2357 | 0.1072 | 0.9302 | 2.8882 |

EXAMPLE 11

Virginia flue tobacco was harvested, and the leaves were placed in a curing barn at about 100–110° F. to begin the flue-curing process. After the leaves turned yellow, about 24–36 hours post-harvest, they were taken from the barn and subjected to microwave radiation in a Goldstar Model MA-1572M microwave oven for about 2 to 2½ minutes, on the high power setting. Each of the leaves was a golden-yellow color, and effectively dried. Certain samples, designated by "ground", were later ground up into a flour-like substance, which would be useful as, for example, a gum, lozenge or food additive. After more than six months from the time the leaves were microwaved, the TSNA content of the following samples were measured using the procedure described in Example 1. The results are shown in Table 11 below:

TABLE 11

| Sample # | NNN | NAT | NAB | NNK | TSNA |
|---|---|---|---|---|---|
| 84-ground | 0.0013 | 0.0018 | 0.0018 | 0.0015 | 0.0064 |
| 85-ground | 0.0469 | 0.0341 | 0.0011 | 0.0009 | 0.0831 |
| 86-ground | 0.0009 | 0.0582 | 0.0013 | 0.0011 | 0.0615 |
| 87-ground | 0.0113 | 0.1078 | 0.1078 | 0.0015 | 0.2284 |
| 88-ground | 0.0569 | 0.1401 | 0.1071 | 0.0009 | 0.3051 |
| 89-ground | 0.0109 | 0.1642 | 0.1073 | 0.0011 | 0.2835 |
| 90-ground | 0.0008 | 0.0011 | 0.0011 | 0.0009 | 0.0038 |
| 91-ground | 0.0009 | 0.0012 | 0.0012 | 0.0010 | 0.0044 |
| 92-ground | 0.0012 | 0.1059 | 0.0017 | 0.0014 | 0.1101 |
| 93-ground | 0.0013 | 0.0529 | 0.0019 | 0.0015 | 0.0576 |
| 94-ground | 0.0012 | 0.0613 | 0.0017 | 0.0014 | 0.0657 |
| 95-ground | 0.0506 | 0.0989 | 0.0013 | 0.0010 | 0.1518 |
| 96-ground | 0.0017 | 0.0894 | 0.0024 | 0.0019 | 0.0954 |
| 97-ground | 0.0012 | 0.0017 | 0.0017 | 0.0014 | 0.0061 |

TABLE 11-continued

| Sample # | NNN | NAT | NAB | NNK | TSNA |
|---|---|---|---|---|---|
| 98-ground | 0.0016 | 0.0023 | 0.0023 | 0.0019 | 0.0082 |
| 99-ground | 0.0342 | 0.0016 | 0.0016 | 0.0013 | 0.0386 |
| 100-ground | 0.0014 | 0.0020 | 0.0020 | 0.0016 | 0.0070 |
| 101-leaf | 0.0013 | 0.0539 | <0.0019 | <0.0016 | 0.0587 |
| 102-leaf | 0.0009 | 0.0012 | <0.0012 | <0.0010 | 0.0043 |
| 103-shredded leaves | 0.0202 | 0.0327 | <0.0007 | <0.0006 | 0.0542 |

It will be apparent to those skilled in the art that various changes and modifications may be made in the preferred embodiments without departing from the spirit and scope of the claimed invention. Therefore, the foregoing description is intended to be illustrative only and should not be viewed in a limiting sense.

What is claimed is:

1. A tobacco product comprising cured non-green or yellow *Virginia flue* tobacco suitable for human consumption, substantially free of organic liquids used to extract expanded organic materials and having a collective content of N'-nitrosonornicotine, 4-(N-nitrosomethylamino)-1-(3-pyridyl)-1-butanone, N'-nitrosoanatabine and N'-nitrosoanabasine which is less than 0.2 μg/g[; wherein said cured non-green or yellow tobacco is selected from the group consisting of flue or bright varieties, Burley varieties, and oriental/Turkish varieties].

2. The tobacco product according to claim 1, wherein said collective content is less than about 0.15 μg/g.

3. The tobacco product according to claim 2, wherein said collective content is less than about 0.1 μg/g.

4. The tobacco product according to claim 1, which is a product selected from the group consisting of cigarettes, cigars, chewing tobacco, snuff and tobacco-containing gum and lozenges.

5. A tobacco product comprising cured non-green or yellow *Virginia flue* tobacco suitable for human consumption, substantially free of organic liquids used to extract expanded organic materials and having a collective content of N'-nitrosonornicotine, 4-(N-nitrosomethylamino)-1-(3-pyridyl)-1-butanone, N'-nitrosoanatabine and N'-nitrosoanabasine which is [0.15] *0.05* μg/g or less.

[6. The tobacco product according to claim 5, wherein said collective content is less than about 0.1 μg/g.]

[7. The tobacco product according to claim 6, wherein said collective content is less than about 0.05 μg/g.]

8. The tobacco product according to claim 5, which is a product selected from the group consisting of cigarettes, cigars, chewing tobacco, snuff, and tobacco-containing gum and lozenges.

9. A tobacco product comprising cured non-green or yellow *Virginia flue* tobacco suitable for human consumption, in leaf form and having a collective content of N'-nitrosonornicotine, 4-(N-nitrosomethylamino)-1-(3-pyridyl)-1-butanone, N'-nitrosoanatabine and N'-nitrosoanabasine which is [0.15] *0.05* μg/g or less.

[10. A tobacco product comprising cured non-green or yellow tobacco suitable for human consumption, in leaf form and having a collective content of N'-nitrosonornicotine, 4-(N-nitrosomethylamino)-1-(3-pyridyl)-1-butanone, N'-nitrosoanatabine and N'-nitrosoanabasine which is less than 0.2 μg/g; wherein said cured non-green or yellow tobacco is selected from the group consisting of flue or bright varieties, Burley varieties, and oriental/Turkish varieties.]

[11. A tobacco product comprising cured non-green or yellow tobacco suitable for human consumption, substantially free of organic liquids used to extract expanded organic materials and having a content of 4-(N-nitrosomethylamino)-1-(3-pyridyl)-1-butanone which is 0.047 μg/g or less.]

12. [The] *A* tobacco product [of claim 11 wherein said] *comprising cured non-green or yellow Virginia flue tobacco suitable for human consumption, substantially free of organic liquids used to extract expanded organic materials and having a* content of 4-(N-nitrosomethylamino)-1-(3-pyridyl)-1-butanone *which* is 0.002 μg/g or less.

[13. A tobacco product comprising cured non-green or yellow tobacco suitable for human consumption, in leaf form and having a content of 4-(N-nitrosomethylamino)-1-(3-pyridyl)-1-butanone which is 0.047 μg/g or less.]

14. [The] *A* tobacco product [of claim 13 wherein said] *comprising cured non-green or yellow Virginia flue tobacco suitable for human consumption, in leaf form and having a* content of 4-(N-nitrosomethylamino)-1-(3-pyridyl)-1-butanone *which* is 0.002 μg/g or less.

*15. The tobacco product of claim 12, wherein said content of 4-(N-nitrosomethyl amino)-1-(3-pyridyl)-1-butanone is 0.001 μg/g or less.*

*16. The tobacco product of claim 14, wherein said content of 4-(N-nitrosomethyl amino)-1-(3-pyridyl)-1-butanone is 0.001 μg/g or less.*

*17. The tobacco product of claim 12, which is a product selected from the group consisting of cigarettes, cigars, chewing tobacco, snuff, and tobacco-containing gum and lozenges.*

*18. The tobacco product of claim 14, which is a product selected from the group consisting of cigarettes, cigars, chewing tobacco, snuff, and tobacco-containing gum and lozenges.*

*19. The tobacco product of claim 9, which is a product selected from the group consisting of cigarettes, cigars, chewing tobacco, snuff, and tobacco-containing gum and lozenges.*

*20. A tobacco product comprising cured non-green or yellow Virginia flue tobacco suitable for human consumption, in leaf form and having a collective content of N'-nitrosonornicotine, 4-(N-nitrosomethylamino)-1-(3-pyridyl)-1-butanone, N'-nitrosoanatabine and N'-nitrosoanabasine which is less than 0.2 μg/g.*

*21. The tobacco product of claim 20, wherein said collective content is 0.15 μg/g or less.*

*22. The tobacco product of claim 21, wherein said collective content is 0.1 μg/g or less.*

*23. The tobacco product of claim 20, which is a product selected from the group consisting of cigarettes, cigars, chewing tobacco, snuff, and tobacco-containing gum and lozenges.*

*24. The tobacco product of claim 1 wherein said tobacco suitable for human consumption is cured yellow tobacco.*

*25. The tobacco product of claim 5 wherein said tobacco suitable for human consumption is cured yellow tobacco.*

*26. The tobacco product of claim 9 wherein said tobacco suitable for human consumption is cured yellow tobacco.*

*27. The tobacco product of claim 12 wherein said tobacco suitable for human consumption is cured yellow tobacco.*

*28. The tobacco product of claim 14 wherein said tobacco suitable for human consumption is cured yellow tobacco.*

* * * * *